(12) United States Patent
Kikuchi et al.

(10) Patent No.: US 6,776,632 B2
(45) Date of Patent: Aug. 17, 2004

(54) CARD CONNECTOR WITH LOCKING MECHANISM

(75) Inventors: Kouji Kikuchi, Tokyo (JP); Masaaki Ooya, Yokohama (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 10/298,065

(22) Filed: Nov. 18, 2002

(65) Prior Publication Data

US 2003/0096521 A1 May 22, 2003

(30) Foreign Application Priority Data

Nov. 19, 2001 (JP) ........................................ 2001-353566
Jan. 30, 2002 (JP) ........................................ 2002-022366
Oct. 30, 2002 (JP) ........................................ 2002-316701

(51) Int. Cl.$^7$ ............................................. H01R 13/62
(52) U.S. Cl. ........................................ 439/159; 439/160
(58) Field of Search ................................. 439/159, 160

(56) References Cited

U.S. PATENT DOCUMENTS 6,394,827 B2 * 5/2002 Nogami ....................... 439/159
6,398,567 B1 * 6/2002 Nishimura ................... 439/159
2002/0037658 A1 * 3/2002 Ozawa ........................ 439/159

FOREIGN PATENT DOCUMENTS

| JP | 11-135192 | 5/1999 |
| JP | 2001-118633 | 4/2001 |
| JP | 2001-143789 | 5/2001 |

* cited by examiner

Primary Examiner—Hae Moon Hyeon
(74) Attorney, Agent, or Firm—Finnegan, Henderson, Farabow, Garrett & Dunner, LLP

(57) ABSTRACT

To restrain the motion of a card in such a way as to allow the card to be pulled out even from a card locked state or card ejected state, the card connector of the present invention includes: a housing formed by a base plate and a metal plate cover mounted on the base plate; an eject mechanism provided in the housing to eject a card, the eject mechanism including an operation member mounted slidable along one side of the housing, a spring member to elastically urge the operation member, and an eject member integrally formed with the operation member and driven by an accumulated elastic force of the spring member to push the operation member to eject the card; and a feeling lock mechanism having a feeling lock member adapted to engage a lock recess of the card.

13 Claims, 22 Drawing Sheets

CARD CONNECTOR WITH LOCKING MECHANISM

This application claims priority from Japanese Patent Application Nos. 2001-353566 filed Nov. 19, 2001, 2002-022366 filed Jan. 30, 2002 and 2002-316701 filed Oct. 30, 2002, which are incorporated hereinto by reference.

BACKGROUND OF THE INVENTION

1. Field of the Invention

The present invention relates to a card connector for electronic devices such as cellular phones, telephones, PDAs (personal digital assistants), portable audio devices, cameras and information terminal devices, and more particularly to a card connector that ensures a smooth withdrawing of a card without damaging it, as would occur if an inserted card in a locked state or ejected state were allowed to be forcibly pulled out.

2. Description of the Related Art

In electronic devices such as cellular phones, telephones, PDAs (personal digital assistants), portable audio devices, cameras and information terminal devices, the use of small memory cards with a built-in IC (integrated circuit) chip for CPU (central processing unit) and memory, such as IC cards, PC (personal computer) cards and SD (secure digital or super desity) cards, has become very widespread in recent years and there are growing demands for card connectors that can accept these small memory cards (see referenced patent 1, for example).

Referenced Patent 1

Japanese Patent Application Laid-Open No. 2001-143789 (FIG. 1 to FIG. 5, pages 3 and 4)

There are market demands on conventional card connectors such as described above that they be reduced in height and volume and strong enough to withstand card insertion and withdrawing operations. Another trend in the market is for card connectors to be able to firmly hold and release an inserted card with ease. To meet these demands, the card connectors have a metal plate cover at the top secured to a base plate of insulated material and also include a card eject mechanism and a card lock mechanism for easily releasing and locking a card.

FIG. 17 to FIG. 22 of the drawings illustrate an example of such conventional card connector. FIG. 17 is an overall perspective view of a conventional card connector 100, FIG. 18 a perspective view of the conventional card connector with the metal plate cover removed, FIG. 19 a plan view showing the conventional card connector in a card locked state, FIG. 20 an enlarged view of a lock portion of the card connector of FIG. 19, FIG. 21 a plan view of the conventional card connector in a card ejected state, and FIG. 22 an enlarged view of the lock portion of the card connector of FIG. 21.

As shown in these figures, the conventional card connector 100 basically comprises a base plate 102, a metal plate cover 103, a eject mechanism 104 for releasing a card 110, and a lock mechanism 105 for locking the card 110.

In the conventional card connector 100 with the above construction, the base plate 102 is molded of an appropriate insulating material such as synthetic resin and is combined with the metal plate cover 103 made of a metal plate to form a hollow, flat housing in which the card 110 can be inserted. Along one side of the base plate 102 of the insulating material is arranged the eject mechanism 104 which ensures a smooth extraction of the card 110 from the card connector 100. The eject mechanism 104 is provided with the lock mechanism 105 that locks the card 110 inserted in the card connector 100.

The eject mechanism 104 in its basic construction comprises an operation lever 106 as an operation member mounted slidable along a side edge of a chamber formed in the base plate 102, a spring member 107 such as a coil spring for elastically urging the operation lever 106, and a push member 108 formed integral with the operation lever 106 to push out the card 110 so that the card can be taken out. When the lock mechanism 105 of the eject mechanism 104 is unlocked, an accumulated elastic force of the spring member 107 pushes the operation lever 106 to eject the card 110 through the push member 108. The push member 108 extends in a direction almost perpendicular to the direction in which the operation lever 106 is operated. The front end portion of the card 110 engages the push member 108 to activate the operation lever 106.

The lock mechanism 105 has a lock arm 109 which is provided at its free end with a locking piece 112 engageable with a lock recess 111 of the card 110. The lock arm 109 is made from a rodlike or elongate platelike member and, at its base end (opposite the locking piece 112 end), is secured to a root portion of the push member 108 so that it is elastically supported like a cantilever. The locking piece 112 has one corner 112a rounded in arc so that, during a card locking operation, the locking piece 112 can easily fall into the lock recess 111 of the card. The other corner 112b of the locking piece 112 is pointed like a barb to prevent the locking piece 112 from inadvertently slipping out of the lock recess 111 of the card 110 and unlocking the card.

After having been inserted and used in such a conventional card connector 100, the memory card 110 such as IC card, PC card or SD card needs to be withdrawn easily. For this purpose, the conventional card connector is provided with the eject mechanism 104. Further, because the inserted card 110 must be held immovable, the conventional card connector 100 is also provided with the lock mechanism 105 for locking the inserted card 110.

In the eject mechanism 104, the push member 108 for pushing the card 110 outwardly is interlocked with or formed integral with the operation lever 106. The locking piece 112 that engages the lock recess 111 of the card 110 is provided to the operation lever 106. In a card ejection operation, the locking piece 112 is disengaged from the lock recess 111 of the card 110 to unlock the card, which can now be pulled out from the card connector 100 easily.

In a card locked state, the locking piece 112 engages the lock recess 111 of the card 110, preventing the card from being withdrawn easily. Therefore, with the card 110 in the locked state, an attempt to withdraw the card forcibly will damage the lock recess 111 and in the worst case even the card connector 100 itself.

To solve these problems experienced with the conventional card connector, it is an object of the present invention to provide a card connector which has a feeling lock mechanism having a feeling lock member adapted to engage the lock recess of the card so that the card can be drawn out both in the card locked state and in the card ejected state.

SUMMARY OF THE INVENTION

To achieve the above objective, the card connector of the present invention comprises: a housing formed by a base plate and a metal plate cover mounted on the base plate; an eject mechanism provided in the housing to eject a card, the eject mechanism including an operation member mounted slidable along one side of the housing, a spring member to elastically urge the operation member, and an eject member integrally formed with the operation member; and a feeling lock mechanism to restrain a motion of the card. This construction allows the lock projection of the feeling lock member of the feeling lock mechanism to disengage easily from the lock recess if the card is forcibly pulled out from a card locked state or a card ejected state. This in turn allows the card to be drawn out easily without causing any damage to the card or the connector itself. This construction also reduces the size of the card connector so that it can be used on information terminal devices such as cellular phones.

Further, in the card connector of the present invention, since the feeling lock mechanism has a feeling lock member adapted to engage a lock recess of the card inserted in the housing, if the card is pulled out forcibly, it can be drawn out easily without damaging the card or the card connector.

Furthermore, in the card connector of the present invention, since the feeling lock member is formed with a lock projection adapted to engage the lock recess of the card inserted in the housing, the card inserted in the housing can be pulled out without causing any damage to the card or the card connector, if the card is pulled out forcibly.

Further, in the card connector of the present invention, since the feeling lock member is so formed that the lock projection can engage the lock recess of the card whether the card inserted in the housing is in a locked state or ejected state, the card can be pulled out from the card locked state or card ejected state without causing any damage to the card or the card connector.

In the card connector of the present invention, the feeling lock member is formed from an elongate platelike spring member and the lock projection is triangular shaped with an apex thereof rounded. This construction allows the card connector to be manufactured easily in small size.

Further, in the card connector of the present invention, since the feeling lock member is provided on the operation member of the eject mechanism, the card connector can be manufactured in a simple, small structure.

Furthermore, in the card connector of the present invention, since the feeling lock member is slightly bent to one side, as the card is inserted, an apex portion of the portion slightly bent to one side engages a wall of the base plate to increase a spring load, preventing the card from being pulled out with a small force and ensuring a firm holding of the card.

Further, in the card connector of the present invention, since the feeling lock member is supported at one end thereof like a cantilevered spring and, at the other end, is formed with the lock projection, the card connector can be manufactured in a simple, robust, small structure easily.

In the card connector of the present invention, the lock projection is formed in a triangular that has a predetermined range of contact angle. If the card is forcibly pulled out from a card locked state or a card ejected state, this construction allows the lock projection of the feeling lock mechanism to disengage easily from the lock recess, assuring an easy withdrawal of the card without damaging the card or the card connector.

Further, in the card connector of the present invention, since the range of contact angle of the lock projection is about 66.75° to 71.35°, if the inserted card is forcibly pulled out from a card locked state or a card ejected state, the lock projection of the feeling lock mechanism can easily disengage from the lock recess of the card in this range of contact angle, allowing the card to be drawn out without causing any damage to the card or the card connector.

The card connector of the present invention comprises: a housing formed by a base plate and a metal plate cover mounted on the base plate; an eject mechanism provided in the housing to eject a card, the eject mechanism including an operation member mounted slidable along one side of the housing, a spring member to elastically urge the operation member, and an eject member integrally formed with the operation member; and a feeling lock mechanism to restrain a motion of the card, the feeling lock mechanism having a feeling lock member supported at both ends thereof, the feeling lock member having a lock projection formed at almost a middle thereof, the lock projection being adapted to engage a lock recess of the card inserted in the housing. This construction increases a card holding force in the card locked state, holds the card firmly against larger vibrations and impacts, allows the card to be drawn out without damaging the card or the card connector even if the card is forcibly pulled out, and enables the card connector to be manufactured in a simple, robust, small structure.

Further, in the card connector of the present invention, since the feeling lock member is so formed that the lock projection can engage the lock recess of the card whether the card is in a locked state or ejected state, the card can properly be withdrawn without causing any damage to the card or the card connector even if the card is forcibly pulled out.

Furthermore, in the card connector of the present invention, since the feeling lock member is formed from an elongate platelike spring member and the lock projection is a triangular shape with an apex thereof rounded, it is possible to manufacture the card connector in small size with ease, allow the card to be withdrawn properly without damaging the card or the card connector even if the card is forcibly pulled out, increase a card holding force in the card lock state, and thereby hold the card reliably against larger vibrations and impacts.

Further, in the card connector of the present invention, since the feeling lock member is provided on the operation member of the eject mechanism, the card connector can be manufactured in a simple, robust, small structure.

Furthermore, in the card connector of the present invention, since the feeling lock member is slightly bent to one side, it can be efficiently installed in a limited narrow space to properly increase a contact pressure. As the card is inserted, the apex portion formed by slightly bending the feeling lock member to one side engages a wall of the base plate to increase the spring force, thereby preventing the card from being withdrawn with a small pulling force and ensuring a reliable holding of the card.

Further, in the card connector of the present invention, since the lock projection is formed in a triangular shape that has a predetermined range of contact angle, if the card is forcibly pulled out from a card locked state or a card ejected state, the lock projection of the feeling lock mechanism can easily disengage from the lock recess of the card, permitting the card to be drawn out easily without causing any damage to the card or the card connector.

In the card connector of the present invention, since the range of contact angle of the lock projection is about 100° to 120°, if the card is forcibly pulled out from a card locked state or a card ejected state, the lock projection of the feeling lock mechanism can easily disengage from the lock recess of the card, allowing the card to be withdrawn without damaging the card or the card connector.

Other objects, features and advantages of the present invention will become apparent from detailed descriptions of embodiments of the invention taken in conjunction with the accompanying drawings.

DETAILED DESCRIPTION OF THE PREFERRED EMBODIMENTS

Embodiment 1

Figure 1:
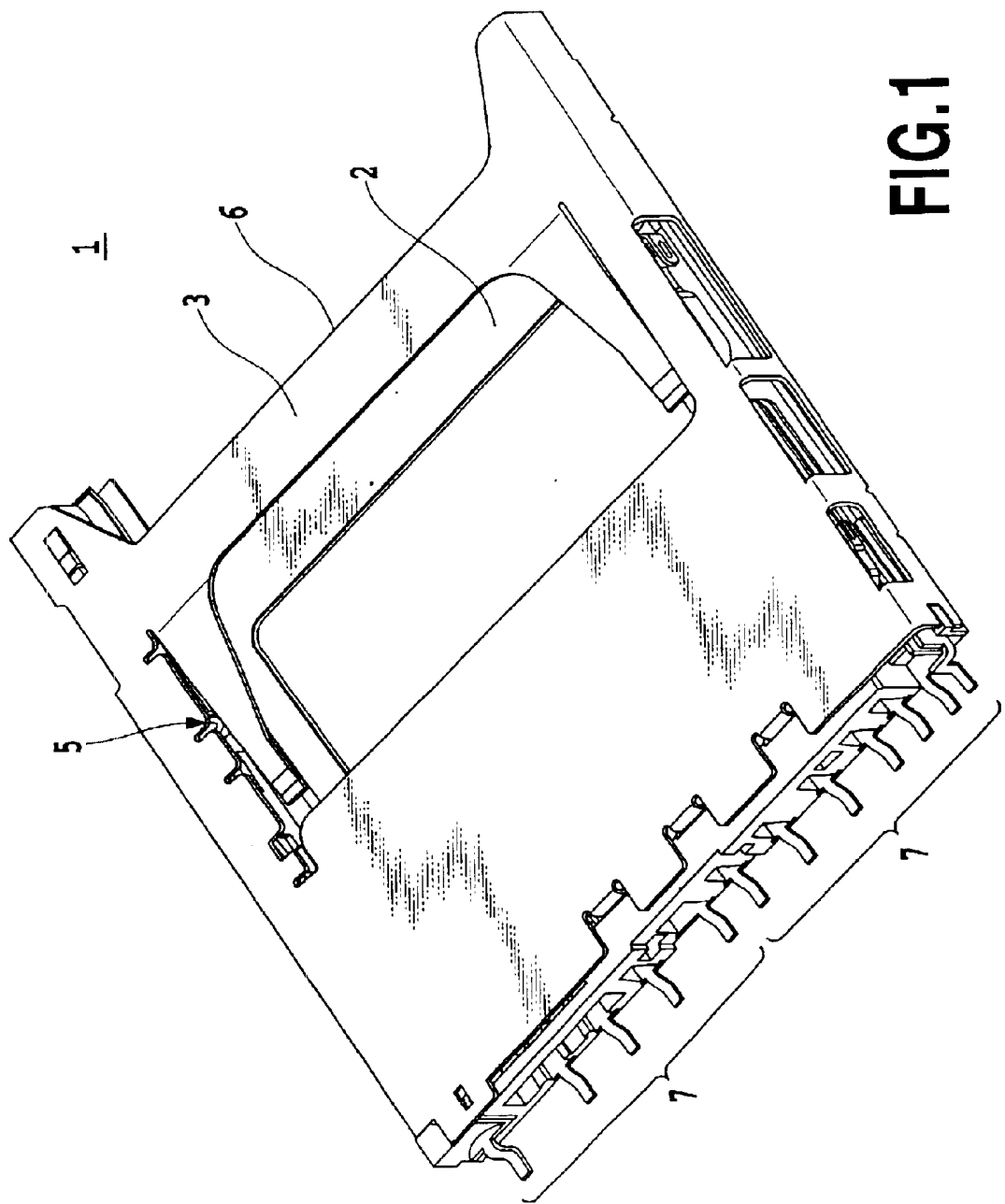
FIG. 1 is an overall perspective view of a card connector in embodiment 1 of the present invention.
Figure 2:
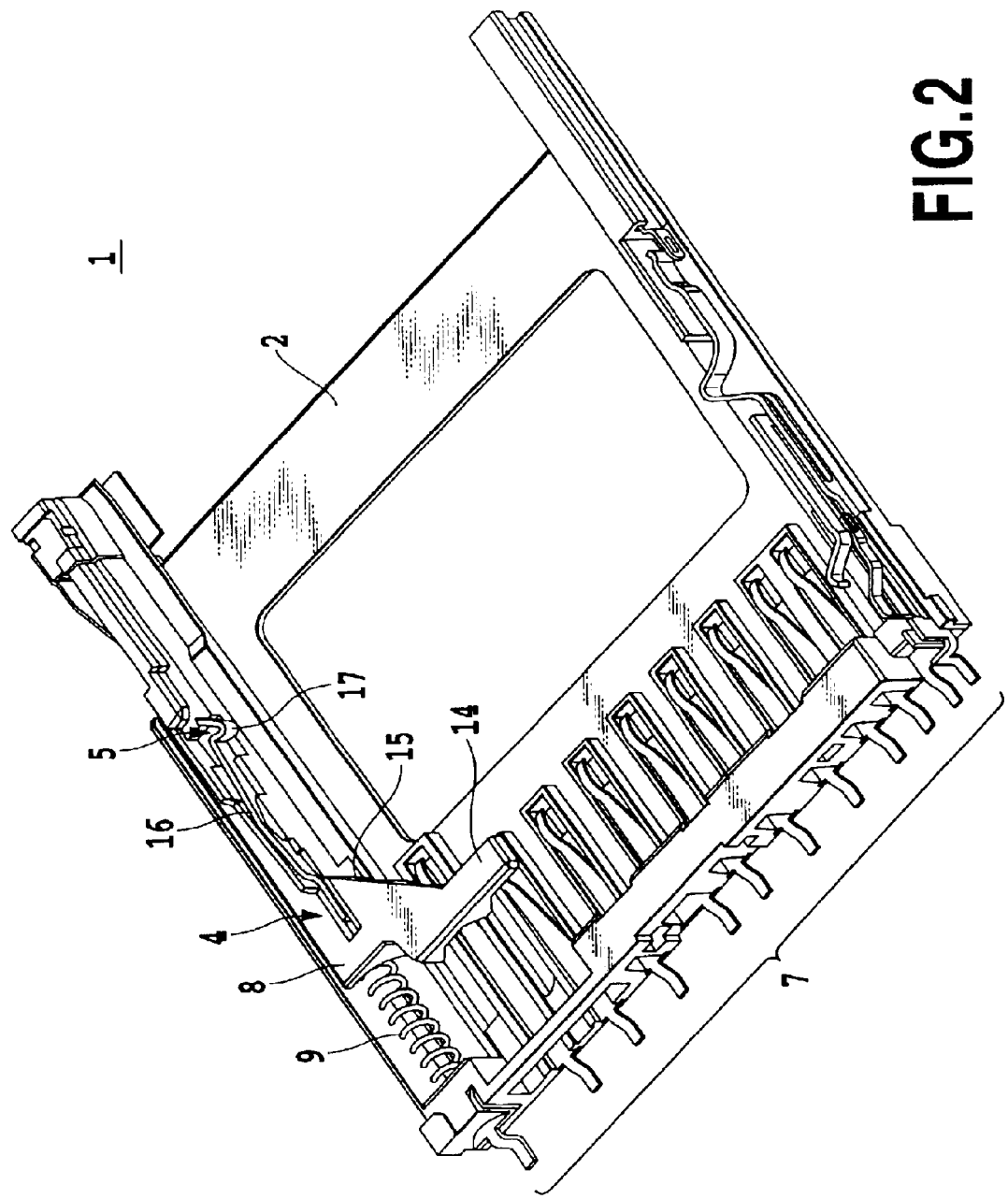
FIG. 2 is a perspective view showing the card connector of the present invention of FIG. 1 with a metal plate cover removed.
Figure 3:
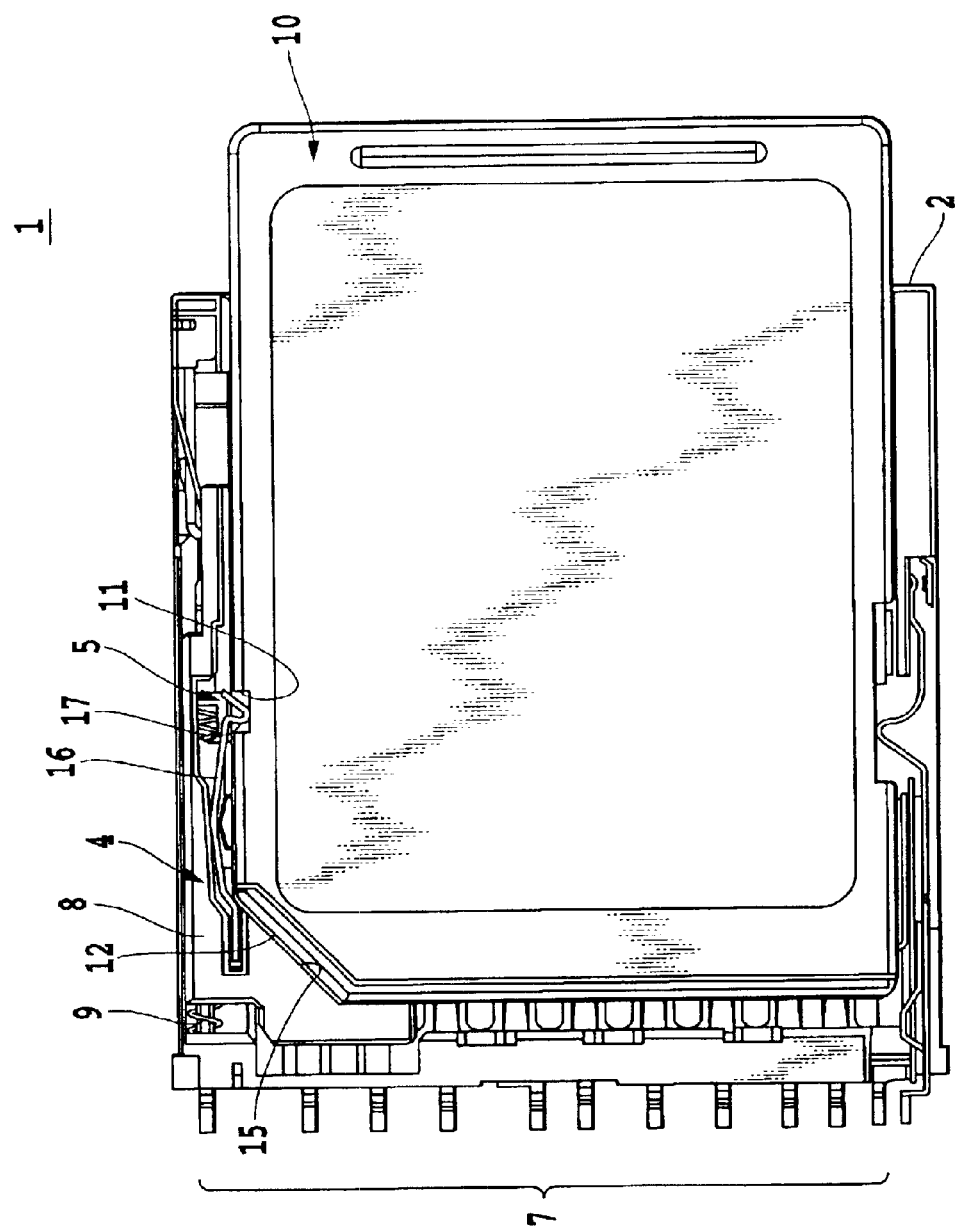
FIG. 3 is a plan view showing the card connector of the present invention of FIG. 2 in a card locked state.
Figure 4:
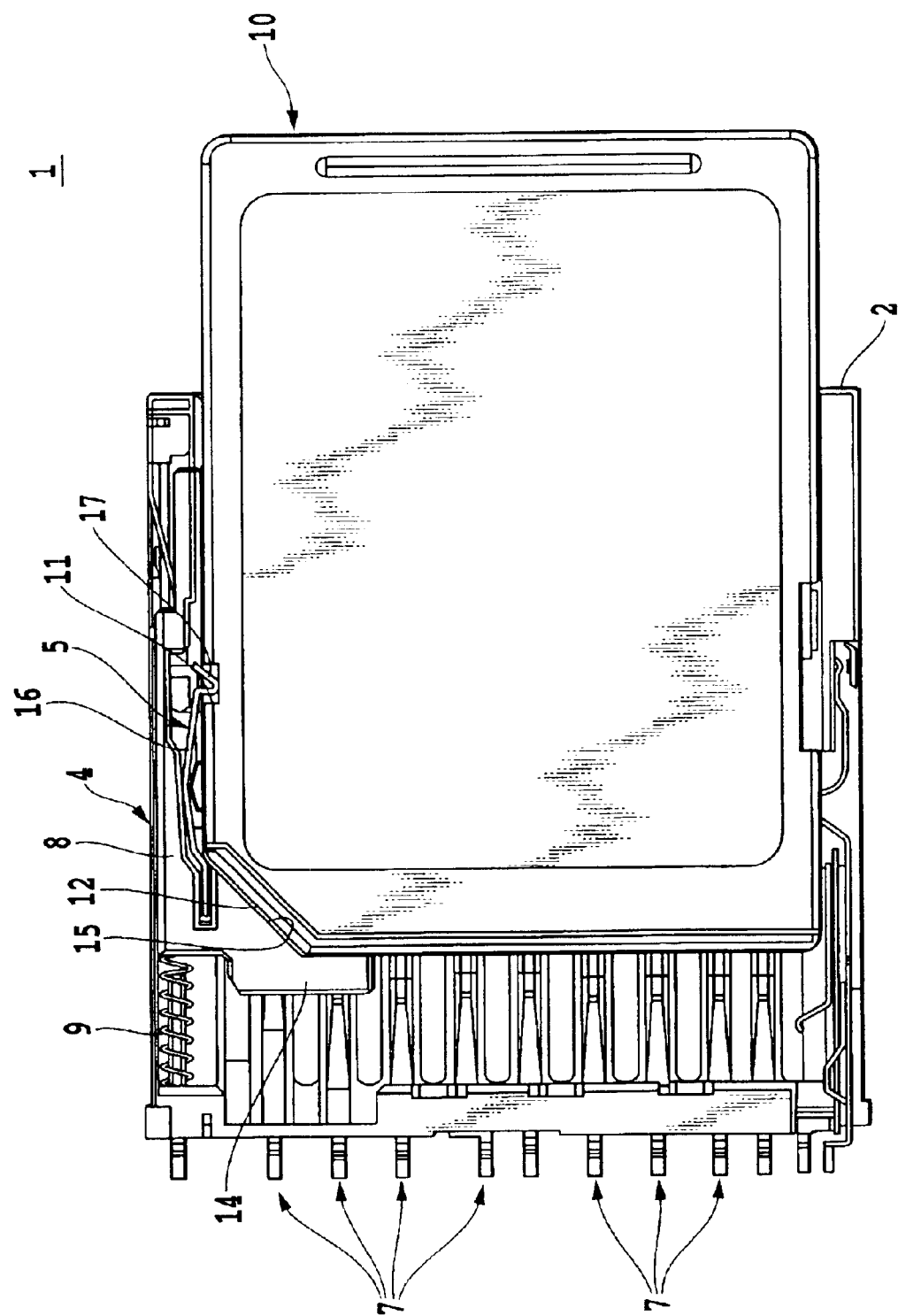
FIG. 4 is a plan view showing the card connector of the present invention in a card ejected state.
Figure 5:
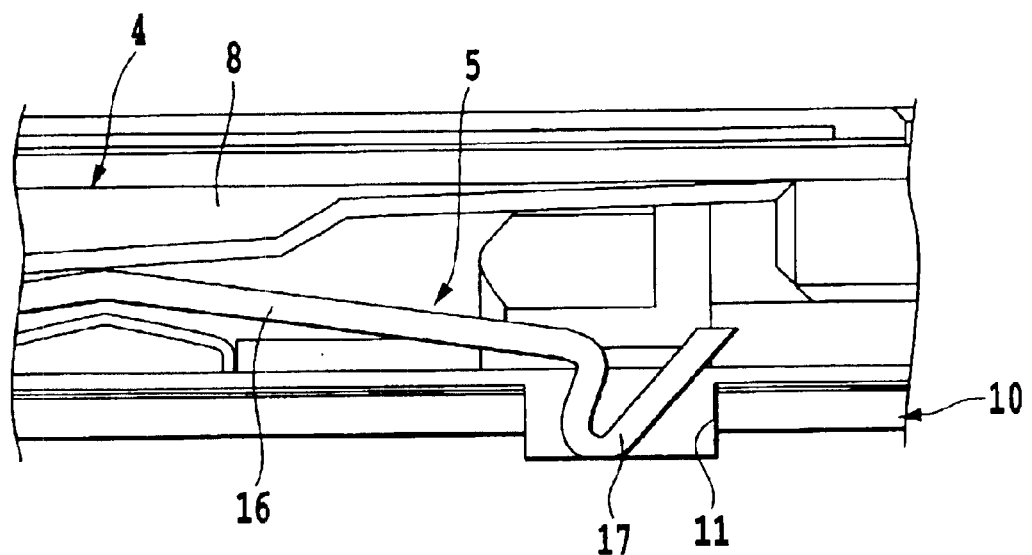
FIG. 5 is an enlarged view of a feeling lock portion and its associated parts in the card connector of the present invention of FIG. 4.

FIG. 1 through FIG. 5 show a first embodiment of the card connector according to the present invention. FIG. 1 is an overall perspective view of the card connector of the present invention, FIG. 2 is a perspective view showing the card connector of the present invention of FIG. 1 with a metal plate cover removed, FIG. 3 is a plan view showing the card connector of the present invention of FIG. 2 in a card locked state, FIG. 4 is a plan view showing the card connector in the card ejected state, and FIG. 5 is an enlarged view showing a feeling lock portion of the card connector of the present invention of FIG. 4.

As shown in FIG. 1 to FIG. 5, the card connector 1 of the present invention has a flat housing formed by a base plate 2 and a metal plate cover 3 mounted on the base plate 2. The card connector 1 is open at one end in the form of a card insertion opening 6 and, at the other end, is closed and has a plurality of contacts 7 that make electrical contacts with a card 10 and which extend into the card connector 1 up to its central portion.

In this embodiment, a card 10 used in the card connector 1 of the present invention may for example be an SD card. The card connector of the present invention is not limited to the use of SD card but other similar memory cards such as IC card can also be used without problem.

As shown in the figures, the card connector 1 of the present invention has the base plate 2, the metal plate cover 3, an eject mechanism 4 for ejecting a card, a feeling lock mechanism 5 for restraining the movement of the card, and a plurality of contacts 7, and may be used, for example, on information terminal devices.

In this card connector 1 of the present invention, the base plate 2 is molded of an insulating material such as an appropriate synthetic resin and is combined with the metal plate cover 3 made from a metal plate to form a hollow, flat housing. The card connector 1 of course has an insertion opening to accept the card 10. Along one side of the base plate 2 of the insulating material is arranged the eject mechanism 4 which, when operated, allows the card 10 to be taken out from the card connector 1 smoothly by the operation of the eject mechanism 4.

The eject mechanism 4 has an operation lever 8 as an operation member mounted slidable along one side edge of a chamber formed in the base plate 2 and a spring member 9 such as a coil spring that elastically urges the operation lever 8. To push out the card 10 by the eject mechanism 4, a latch of the operation lever 8 is released to allow an accumulated elastic force of the spring member 9 to push the operation lever 8 outwardly. A push member 14 is a member for ejecting the card 10 and is formed integral with the operation lever 8.

The push member 14 extends in a direction almost perpendicular to the direction in which the operation lever 8 is activated, and engages a front end portion of the card 10. A connecting portion between the operation lever 8 and the push member 14 is formed at its corner with a receiving portion 15 which a cut-off corner portion 12 of the card 10 engages. In this eject mechanism 4, therefore, the card 10 can come into contact with the push member 14 so that the card can push the operation lever 8 through the push member 14 and that the operation lever 8 can eject the card 10 through the push member 14.

For prevention of erroneous operation, the card 10 has one corner cut off to form a cut-off corner portion 12, which prevents the card 10 from being placed upside down and inserted into the card connector 1.

In addition to the eject mechanism 4, the card connector 1 of the present invention has a feeling lock mechanism 5. The feeling lock mechanism 5 for the present invention has a feeling lock member 16, which is a cantilevered member made from an elongate platelike spring member secured to the operation lever 8. The feeling lock member 16 has its free end curved to form a lock projection 17 in a rounded triangular configuration which is engageable with a lock recess 11 of the card 10.

The feeling lock member 16 is slightly bent to one side so that it is shaped like a flattened arcuate shape. Bent in the shape of a flattened arcuation and supported at one end, the feeling lock member 16 can produce an increased contact pressure when appropriately installed in a limited space. In other words, when the card 10 is inserted, an apex portion of the feeling lock member 16, formed by slightly bending the feeling lock member 16 to one side, engages a wall of the base plate 2 to increase a spring load, thereby preventing the card 10 from being pulled out with a small force and ensuring a firm holding of the card.

The shape of the feeling lock member 16 is not limited to the flattened arcuate shape but may take any other desired shape, such as bowlike, dishlike and arc configurations.

In the card connector 1 of the present invention, the feeling lock member 16 of the feeling lock mechanism 5 has one end thereof secured to the operation lever 8 and is thus supported as a cantilevered spring. Therefore, when the lock projection 17 of the feeling lock mechanism 5 engages the lock recess 11 of the card 10, the feeling lock mechanism 5 can support and hold the card 10 reliably with an elastic force of the cantilevered spring. Further, when a withdrawing force is applied to the card 10, a corner of the lock recess 11 of the card 10 pushes the lock projection 17 of the feeling lock member 16 outwardly, disengaging the lock projection 17 from the lock recess 11, with the result that the card 10 can be pulled out from the card connector 1.

Therefore, in the card locked state (FIG. 3) in which the lock projection 17 of the feeling lock member 16 engages the lock recess 11 of the card 10 or in the card ejected state (FIG. 4), an attempt to forcibly pull out the card 10 can easily disengage the lock projection 17 of the feeling lock member 16 from the lock recess 11 of the card 10. This is because the feeling lock member 16 is formed from an elongate platelike spring member elastically supported like a cantilevered spring. Thus, the card connector 1 allows the card 10 to be pulled out easily without damaging the card 10 or the card connector 1.

The card connector 1 of the present invention in use is shown in FIG. 3 to FIG. 5. FIG. 3 is a plan view illustrating the card connector 1 in a card locked state, FIG. 4 is a plan view showing the card connector 1 in a card ejected state, and FIG. 5 is an enlarged view showing the feeling lock portion in the card connector 1 of FIG. 4.

Referring to FIG. 3, the card connector 1 of the present invention is mounted on a printed circuit board of an information terminal device or electronic device, with the contacts 7 connected to associated circuits. In the state of FIG. 3 the card 10 is shown to be inserted in the card connector 1 and locked by the feeling lock mechanism 5.

When the memory card 10, for example an SD card, is inserted into the card connector 1, the front end portion of the card 10 engages the push member 14 in the card locked state of FIG. 3. The card is further advanced sufficiently inwardly, causing the lock projection 17 of the feeling lock member 16 to fall into the lock recess 11 to lock the card 10. Thus, in the card locked state of FIG. 3, the card 10 is fixed by the lock projection 17 of the feeling lock member 16 engaging the lock recess 11 after the card 10 is inserted sufficiently into the card connector 1. Hence, the card 10 in this locked state is prevented from coming off by the feeling lock member 16.

In this card locked state, if it is attempted to forcibly pull out the card 10, the lock projection 17 of the feeling lock member 16 can easily disengage from the lock recess 11 of the card 10. This is because the feeling lock member 16 is formed from an elongate platelike spring member elastically supported like a cantilevered spring. Thus, the card 10 can easily be pulled out from the card connector 1 without being damaged.

Next, let us consider a case where the eject mechanism 4 is activated to bring the card 10 from the locked state shown in FIG. 3 to an ejected state of FIG. 4. When the eject mechanism 4 is operated, the spring member 9 of the eject mechanism 4 drives the operation lever 8 outwardly, pushing the card 10 to the card ejected position of FIG. 4 through the push member 14. In this state the lock projection 17 of the feeling lock member 16 of the eject mechanism 4 remains engaged in the lock recess 11 of the card 10 as shown in FIG. 4 and FIG. 5. That is, the card 10 is ejected outwardly with the lock projection 17 still engaging the lock recess 11. Hence, the card 10 is prevented from being ejected alone and falling out of the card connector 1 and can reliably be stopped at the ejected position shown in FIG. 4 and held there.

In this ejected state, if the card 10 is forcibly pulled out, the lock projection 17 of the feeling lock member 16 can easily disengage from the lock recess 11 of the card 10. This is realized because the feeling lock member 16 is formed from an elongate platelike spring member elastically supported like a cantilevered spring. Thus, the card connector 1 allows the card 10 to be pulled out easily without damaging the card 10 or the card connector 1 itself.

As described above, the card connector 1 of the present invention has a hollow, flat housing formed by the base plate 2 and the metal plate cover 3 mounted on the base plate 2. In this housing the feeling lock mechanism 5 is provided in addition to the eject mechanism 4. This arrangement of the card connector 1 allows the card 10 to be pulled out without being damaged even if the card 10 inserted in the card connector 1 is forcibly drawn out from the card locked state or the card ejected state. This can be realized because the lock projection 17 of the feeling lock member 16 of the feeling lock mechanism 5 can easily be disengaged from the lock recess 11 of the card 10. Hence, with this card connector 1, the card can easily be taken out also without damaging the card connector 1 itself. When viewed in terms of a technological trend for a smaller card size, the construction of the present invention has an advantage of being able to manufacture a small card connector capable of accepting and ejecting a small card with ease and to suitably apply such a small card connector to information terminal devices such as cellular phones.

Embodiment 2

Figure 6:
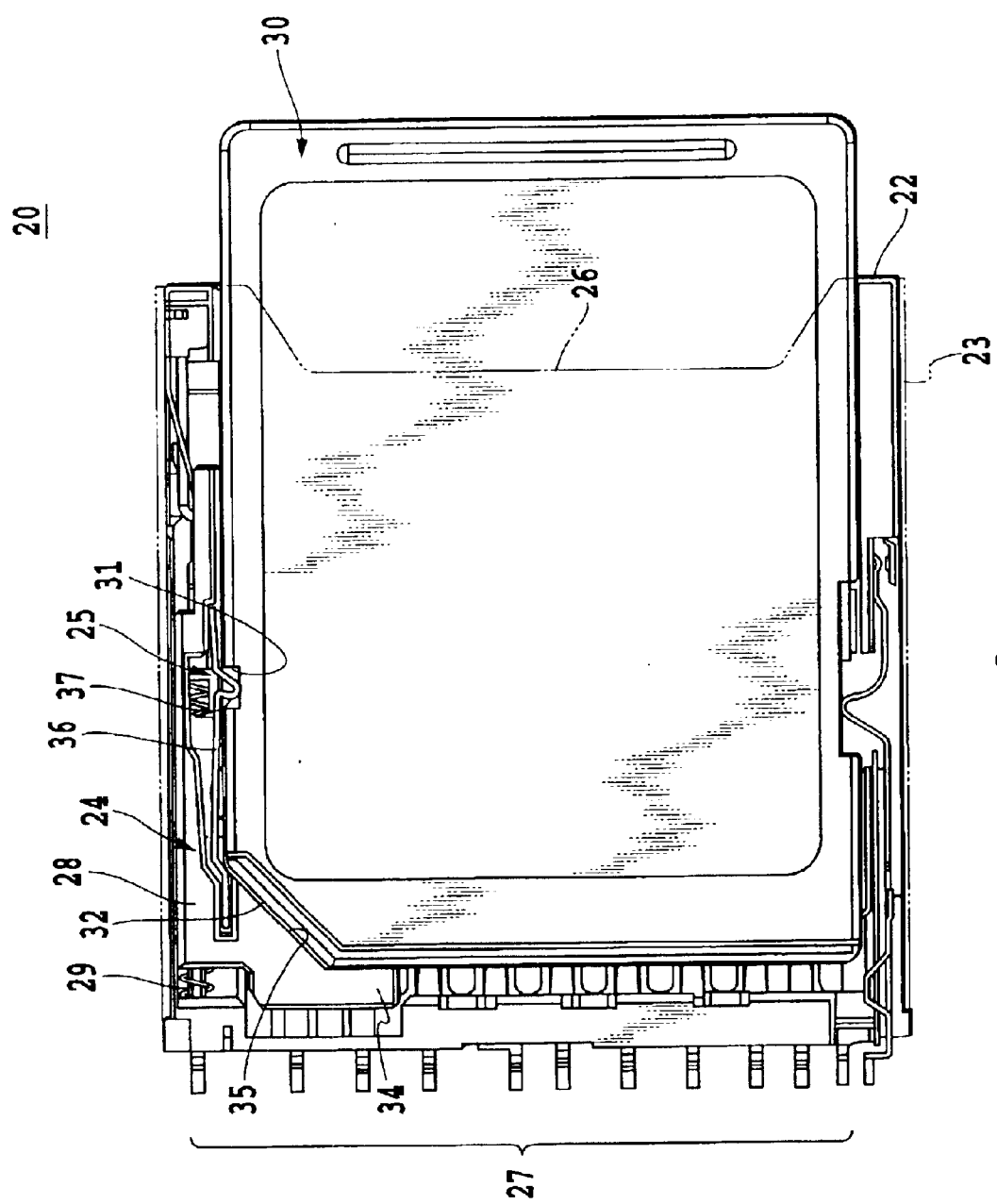
FIG. 6 is a plan view showing a card connector in embodiment 2 of the present invention in a card locked state.
Figure 7:
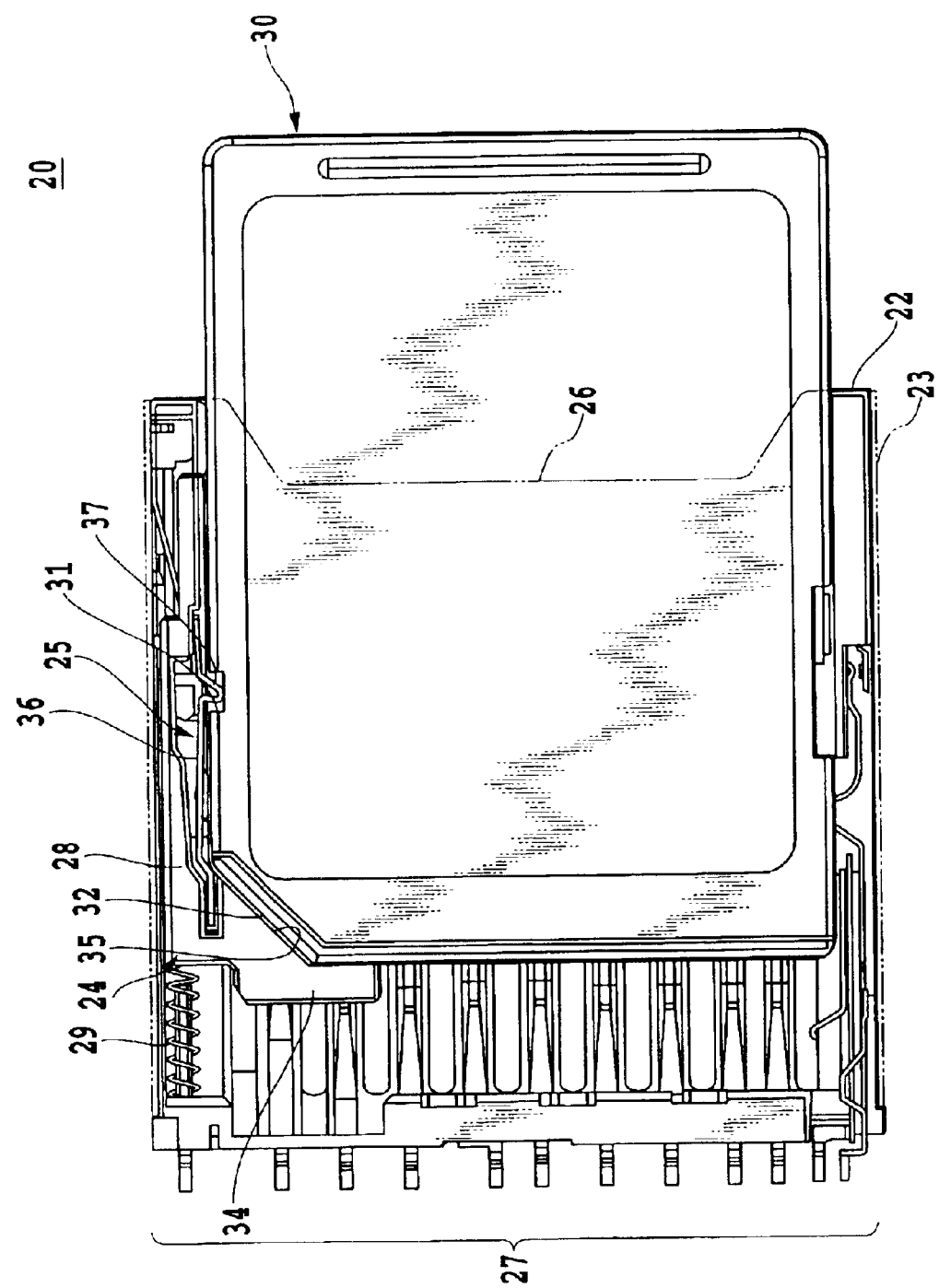
FIG. 7 is a plan view showing the card connector of FIG. 6 in a card ejected state.
Figure 8:
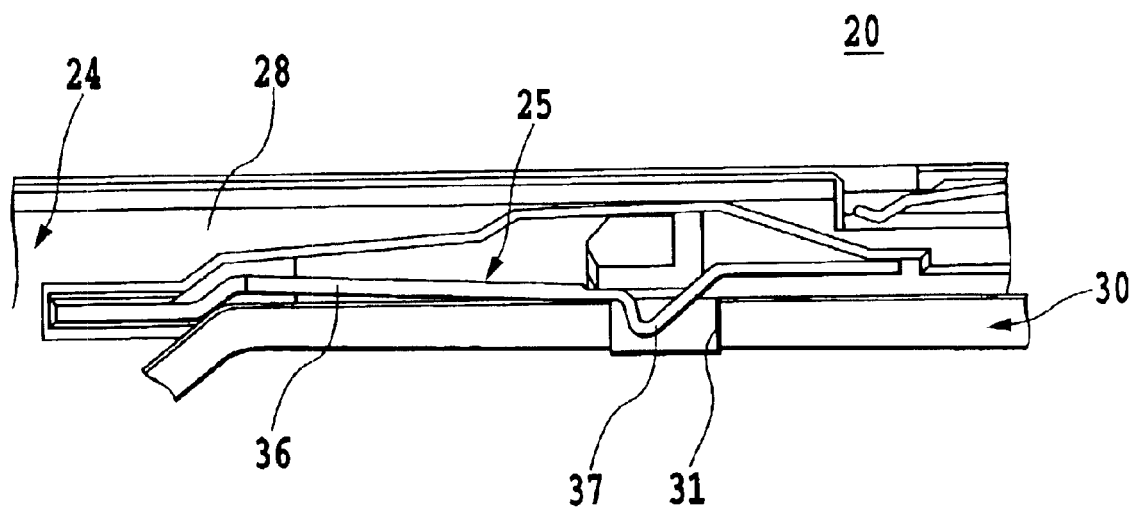
FIG. 8 is an enlarged view of a feeling lock portion and its associated parts in the card connector of FIG. 4.

FIG. 6 to FIG. 8 show a second embodiment of the card connector according to the present invention. FIG. 6 is a plan view showing the card connector of embodiment 2 of the present invention in a card locked state. FIG. 7 is a plan view showing the card connector of FIG. 6 in a card ejected state. FIG. 8 is an enlarged view showing a feeling lock portion of the card connector of FIG. 6.

As shown in FIG. 6 to FIG. 8, the card connector 20 in embodiment 2 of the present invention is similar in a basic construction to that of embodiment 1, except that a feeling lock member 36 of a feeling lock mechanism 25 is supported at both ends.

As shown in the figures, the card connector 20 of the present invention has a flat housing formed by a base plate 22 and a metal plate cover 23 mounted on the base plate 22. The card connector 20 is open at one end in the form of a card insertion opening 26 and, at the other end, is closed and has a plurality of contacts 27 that make electrical connections with a card 30 and which extend into the card connector 1 up to its central portion.

In this embodiment, the card 30 used in the card connector 20 of the present invention may for example be an SD card, as in embodiment 1. The card connector of the present invention is not limited to the use of SD card but other similar memory cards such as IC card can also be used without problem.

As shown in the figures, the card connector 20 of the present invention has the base plate 22, the metal plate cover 23, an eject mechanism 24 for ejecting a card, a feeling lock mechanism 25 for restraining the movement of the card, and a plurality of contacts 27. This card connector may be used, for example, on information terminal devices.

In this card connector 20, the base plate 22 is molded of an insulating material such as an appropriate synthetic resin and is combined with the metal plate cover 23 made from a metal plate to form a hollow, flat housing. The card connector 20 of course has an insertion opening to accept the card 30. Along one side of the base plate 22 of the insulating material is arranged the eject mechanism 24 which, when operated, allows the card 30 to be taken out from the card connector 20 smoothly.

The eject mechanism 24 has an operation lever 28 as an operation member mounted slidable along one side edge of a chamber formed in the base plate 22 and a spring member 29 such as a coil spring that elastically urges the operation lever 28. To push out the card 30 by the eject mechanism 24, a latch of the operation lever 28 is disengaged to allow an accumulated elastic force of the spring member 29 to push the operation lever 28 outwardly. A push member 34 is a member for ejecting the card 30 and is formed integral with the operation lever 28.

The push member 34 extends in a direction almost perpendicular to the direction in which the operation lever 28 is activated, and engages a front end portion of the card 30. A connecting portion between the operation lever 28 and the push member 34 is formed at its corner with a receiving portion 35 which a cut-off corner portion 32 of the card 30 engages. In this eject mechanism 24, therefore, the card 30 can come into contact with the push member 34 so that the card 30 can push the operation lever 28 through the push member 14 and that the operation lever 28 can eject the card 30 through the push member 34.

For prevention of erroneous operation, the card 30 has one corner cut off to form a cut-off corner portion 32, which prevents the card 30 from being placed upside down and inserted into the card connector 20.

The base plate 22, the metal plate cover 23 and the eject mechanism 24 of the card connector 20 in embodiment 2 of the present invention have essentially the same constructions as those of embodiment 1.

In addition to the eject mechanism 24, the card connector 20 of embodiment 2 of the present invention has a feeling lock mechanism 25. The feeling lock mechanism 25 has a feeling lock member 36, which is a doubly supported member made from an elongate platelike spring member secured to the operation lever 28. The feeling lock member 36 is supported at both ends and has a middle portion thereof curved to form a lock projection 37 in a rounded triangular shape which is engageable with a lock recess 31 of the card 30.

The feeling lock member 36 is very slightly bent to one side, i.e., toward the inner side, so that it is shaped like a flattened arcuate shape. Bent in the shape of a flattened arcuation and supported at both ends, the feeling lock member 36 can produce an increased contact pressure when appropriately installed in a limited space. In other words, when the card 30 is inserted, an apex portion of the feeling lock member 36, formed by slightly bending the feeling lock member 36 to one side, engages a wall of the base plate 22 to increase a spring load, thereby preventing the card 30 from being pulled out with a small force and ensuring a reliable holding of the card with an increased holding force.

The shape of the feeling lock member 36 is not limited to the flattened arcuate shape but may take any other desired shape, such as bowlike, dishlike and arc configurations.

In the card connector 20 of the present invention, the feeling lock member 36 of the feeling lock mechanism 25 has both ends thereof secured to the operation lever 28 and is thus supported as a doubly supported spring. Therefore, when the lock projection 37 of the feeling lock mechanism 25 engages the lock recess 31 of the card 30, the feeling lock mechanism 25 can support and hold the card 30 reliably with an increased elastic holding force of the doubly supported spring. Further, when a withdrawing force is applied to the card 30, a corner of the lock recess 31 of the card 30 pushes the lock projection 37 of the feeling lock member 36 outwardly, disengaging the lock projection 37 from the lock recess 31, with the result that the card 30 can be pulled out from the card connector 20 smoothly.

Therefore, in the card locked state (FIG. 6) in which the lock projection 37 of the feeling lock member 36 engages the lock recess 31 of the card 30 or in the card ejected state (FIG. 7), an attempt to forcibly pull out the card 30 can easily disengage the lock projection 37 of the feeling lock member 36 from the lock recess 31 of the card 30. This is because the feeling lock member 36 is formed from an elongate platelike spring member elastically supported at both ends as a doubly supported spring. Thus, the card connector 20 allows the card 30 to be pulled out easily without damaging the card 30 or the card connector 20 itself. Moreover, in this embodiment, the doubly supported feeling lock member 36 increases the card holding force in the card locked state and thus can hold the card 30 reliably against larger vibrations and impacts.

The card connector 20 of embodiment 2 of the present invention in use is shown in FIG. 6 and FIG. 7. FIG. 6 illustrates a card locked state and FIG. 7 represents a card ejected state.

Referring to FIG. 6 of the card locked state, the card connector 20 of this embodiment is mounted on a printed circuit board of an information terminal device or electronic device, with the contacts 27 connected to associated circuits. In the state of FIG. 6 the card 30 is shown to be inserted in the card connector 20 and locked by the feeling lock mechanism 25.

When the memory card 30, for example an SD card, is inserted into the card connector 20, the front end portion of the card 30 engages the push member 34 in the card locked state of FIG. 6. The card is further advanced sufficiently inwardly, causing the lock projection 37 of the feeling lock member 36 to fall into the lock recess 31 to lock the card 30. Thus, in the card locked state of FIG. 6, the card 30 is fixed by the lock projection 37 of the feeling lock member 36 engaging the lock recess 31 after the card 30 is inserted sufficiently into the card connector 20. Hence, the card 30 in this locked state is prevented from coming off and reliably held by the feeling lock member 36.

In this card locked state, if it is attempted to forcibly pull out the card 30, the lock projection 37 of the feeling lock member 36 can easily disengage from the lock recess 31 of the card 30 because the feeling lock member 36 is formed from an elongate platelike spring member elastically supported at both ends like a doubly supported spring. Thus, the card 30 can easily be pulled out from the card connector 20 without being damaged.

Next, let us consider a case where the eject mechanism 24 is activated to bring the card 30 from the locked state shown in FIG. 6 to an ejected state of FIG. 7. When the eject mechanism 24 is operated, the spring member 29 of the eject mechanism 24 drives the operation lever 28 outwardly, pushing the card 30 to the card ejected position of FIG. 7 through the push member 34 as in the case of embodiment 1. In this state the lock projection 37 of the feeling lock member 36 of the eject mechanism 24 remains engaged in the lock recess 31 of the card 30 as shown in FIG. 7 and FIG. 8. That is, the card 30 is ejected outwardly with the lock projection 37 still engaging the lock recess 31. Hence, the card 30 is prevented from being ejected alone and falling out of the card connector 20 and can reliably be stopped at the ejected position shown in FIG. 7 and held there.

In this ejected state, if the card 30 is forcibly pulled out, the lock projection 37 of the feeling lock member 36 can easily disengage from the lock recess 31 of the card 30. This is realized because the feeling lock member 36 is formed from an elongate platelike spring member elastically supported like a doubly supported spring. Thus, the card connector 20 allows the card 30 to be pulled out easily without damaging the card 30 or the card connector 20 itself.

As described above, the card connector 20 of embodiment 2 of the present invention has a hollow, flat housing formed by the base plate 22 and the metal plate cover 23 mounted on the base plate 2. In this housing the feeling lock mechanism 25 is provided in addition to the eject mechanism 24. This arrangement of the card connector 20 allows the card 30 to be pulled out without being damaged even if the card 30 inserted in the card connector 20 is forcibly drawn out from the card locked state or the card ejected state. This can be realized because the lock projection 37 of the feeling lock member 36 of the feeling lock mechanism 25 can easily be disengaged from the lock recess 31 of the card 30. When viewed in terms of a technological trend for a smaller card size, the construction of the present invention has an advantage of being able to provide a card connector capable of accepting and ejecting a small card with ease without damaging the card or the card connector itself.

Further, with embodiment 2 of the present invention, it is possible to manufacture the card connector 20 in a small and robust structure so that it can suitably be applied to information terminal devices such as cellular phones. In this embodiment in particular, the feeling lock member 36 in the form of doubly supported spring increases the card holding force in the card locked state and thus can hold the card 30 reliably against larger vibrations and impacts.

Embodiment 3

Figure 9:
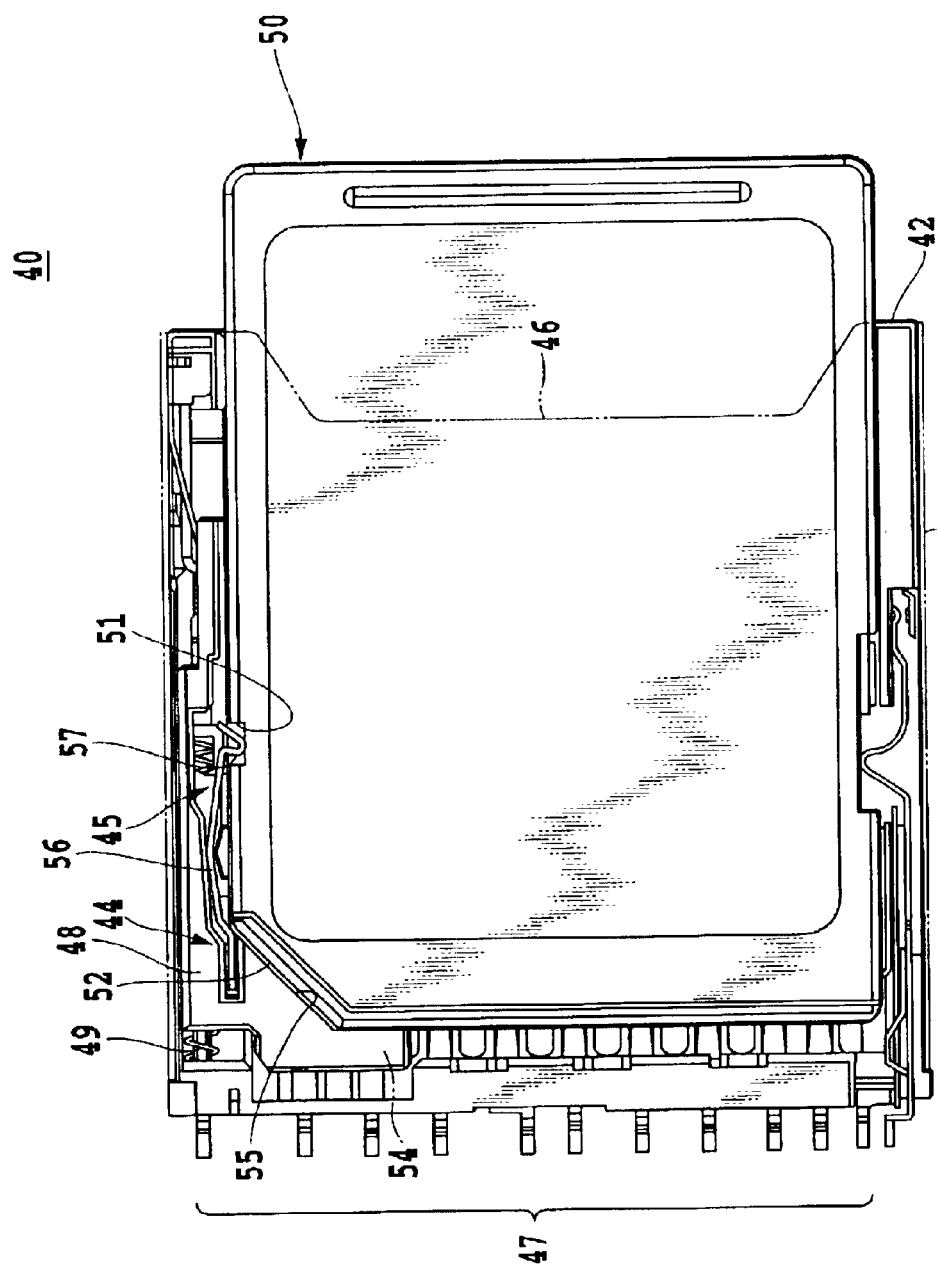
FIG. 9 is a plan view showing a card connector in embodiment 3 of the present invention in a card locked state.
Figure 10:
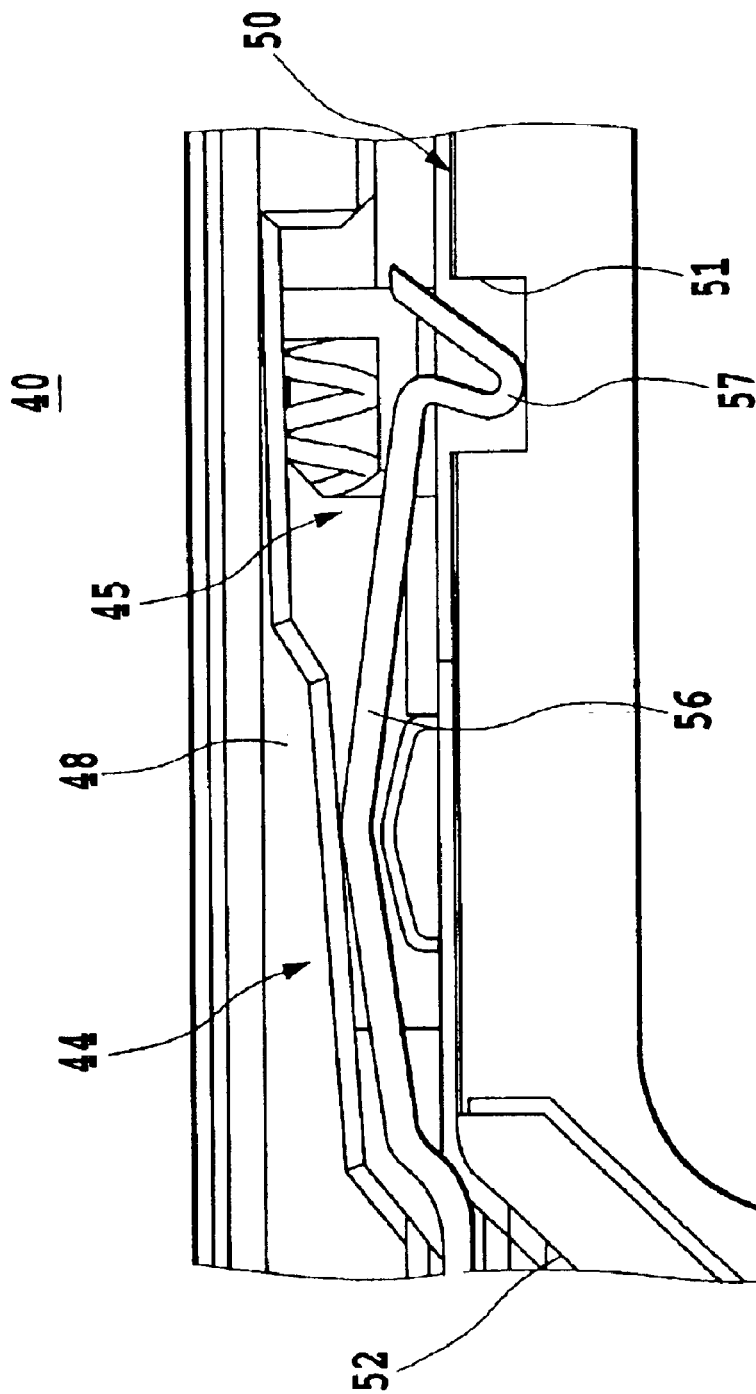
FIG. 10 is an enlarged view of a feeling lock portion and its associated parts in the card connector of FIG. 9.
Figure 11:
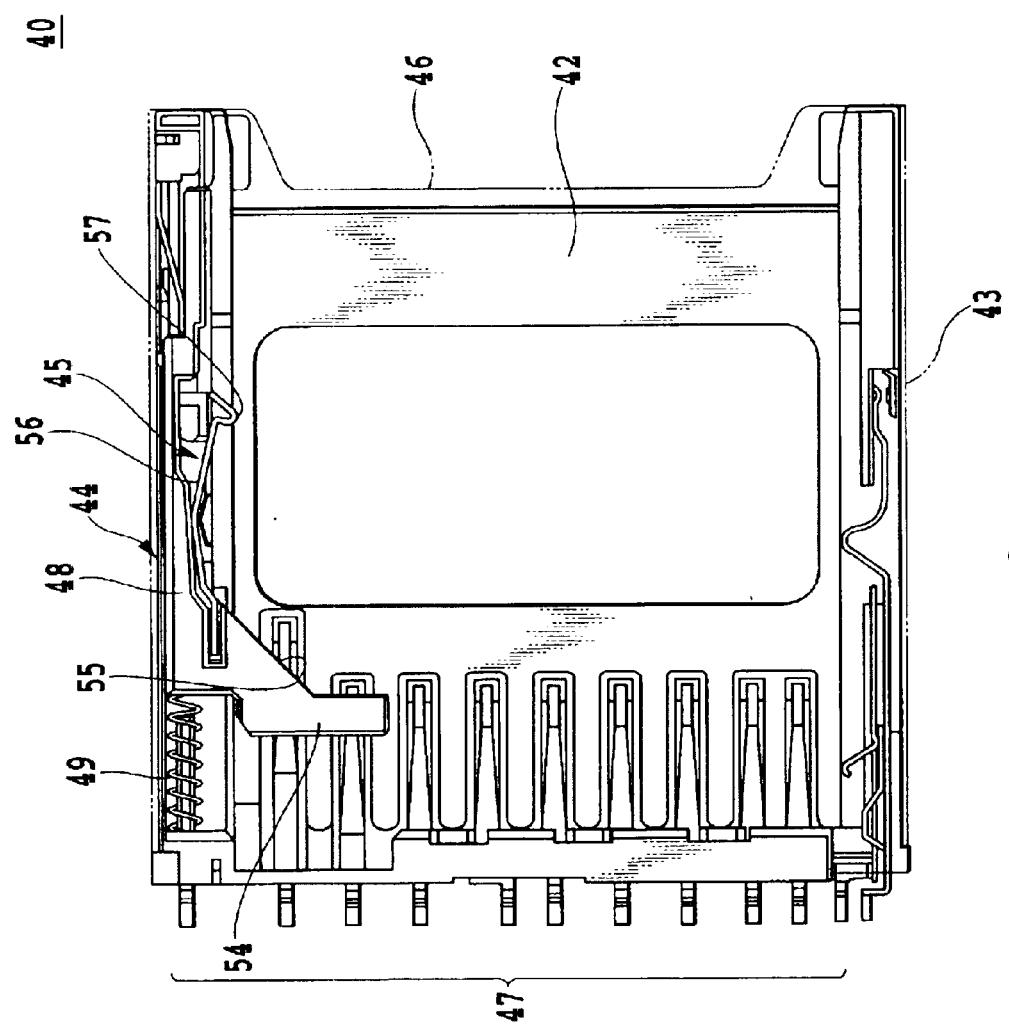
FIG. 11 is a plan view of the card connector of FIG. 9 in a card ejected state with the card removed.
Figure 12:
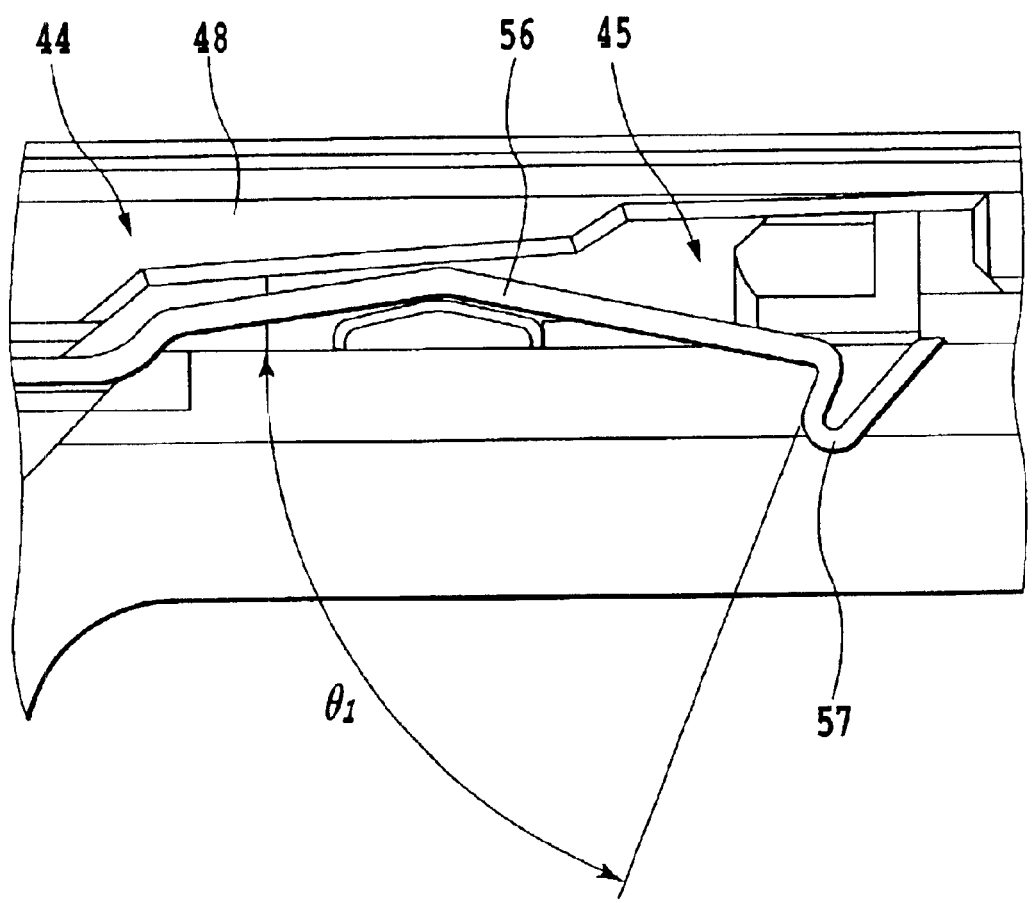
FIG. 12 is an enlarged view of a feeling lock portion and its associated parts in the card connector of FIG. 11.

FIG. 9 to FIG. 12 illustrate a third embodiment of the card connector according to the present invention. FIG. 9 is a plan view showing the card connector of embodiment 3 in a card locked state. FIG. 10 is an enlarged view showing a feeling lock portion of the card connector of FIG. 9. FIG. 11 is a plan view showing the card connector in a card ejected state with a card removed. FIG. 12 is an enlarged view showing a feeling lock portion of the card connector of FIG. 11.

As shown in FIG. 9 through FIG. 12, the card connector 40 in embodiment 3 of the present invention is similar in a basic construction to that of embodiment 1, except that a contact angle $\theta_1$ of a lock projection 57 of a feeling lock member 56 of a feeling lock mechanism 45 is restricted to a specified range.

As shown in the figures, the card connector 40 of embodiment 3 of the present invention has a flat housing formed by a base plate 42 and a metal plate cover 43 mounted on the base plate 42. The card connector 40 is open at one end in the form of a card insertion opening 46 and, at the other end, is closed and has a plurality of contacts 47 that make electrical connections with a card 50 and which extend into the card connector 40 up to its central portion.

In this embodiment, the card 50 used in the card connector 40 of the present invention may for example be an SD card, as in embodiment 1. The card connector of this embodiment is not limited to the use of SD card but other similar memory cards such as IC card can also be used without problem.

As shown in the figures, the card connector 40 of the present invention has the base plate 42, the metal plate cover 43, an eject mechanism 44 for ejecting a card, a feeling lock mechanism 45 for restraining the movement of the card, and a plurality of contacts 47. This card connector may be used, for example, on information terminal devices.

In this card connector 40, the base plate 42 is molded of an insulating material such as an appropriate synthetic resin and is combined with the metal plate cover 43 made from a metal plate to form a hollow, flat housing. The card connector 40 of course has an insertion opening to accept the card 50. Along one side of the base plate 42 of the insulating material is arranged the eject mechanism 44 which, when operated, allows the card 50 to be taken out from the card connector 40 smoothly.

The eject mechanism 44 has an operation lever 48 as an operation member mounted slidable along one side edge of a chamber formed in the base plate 42 and a spring member 49 such as a coil spring that elastically urges the operation lever 48. To push out the card 50 by the eject mechanism 44, a latch of the operation lever 48 is disengaged to allow an accumulated elastic force of the spring member 49 to push the operation lever 48 outwardly. A push member 54 is a member for ejecting the card 50 and is formed integral with the operation lever 58.

The push member 54 extends in a direction almost perpendicular to the direction in which the operation lever 48 is activated, and engages a front end portion of the card 50. A connecting portion between the operation lever 48 and the push member 54 is formed at its corner with a receiving portion 55 which a cut-off corner portion 52 of the card 50 engages. In this eject mechanism 44, therefore, the card 50 can come into contact with the push member 54 so that the card 50 can push the operation lever 48 through the push member 54 and that the operation lever 48 can eject the card 50 through the push member 54.

For prevention of erroneous operation, the card 50 has one corner cut off to form a cut-off corner portion 52, which prevents the card 50 from being placed upside down and inserted into the card connector 40.

The base plate 42, the metal plate cover 43 and the eject mechanism 44 of the card connector 40 in embodiment 3 of the present invention have essentially the same constructions as those of embodiment 1.

In addition to the eject mechanism 44, the card connector 40 of embodiment 3 of the present invention has a feeling lock mechanism 45. The feeling lock mechanism 45 has a feeling lock member 56, which is a cantilevered member made from an elongate platelike spring member secured to the operation lever 48. The feeling lock member 56 has its free end curved to form a lock projection 57 in a rounded triangular shape which is engageable with a lock recess 31 of the card 50.

The feeling lock member 56 is very slightly bent to one side, i.e., toward the inner side, so that it is shaped like a flattened arcuate shape. Bent in the shape of a flattened arcuation and supported at one end, the feeling lock member 56 can produce an increased contact pressure when appropriately installed in a limited space. In other words, when the card 50 is inserted, an apex portion of the feeling lock member 56, formed by slightly bending the feeling lock member 56 to one side, engages a wall of the base plate 42 to increase a spring load, thereby preventing the card 50 from being pulled out with a small force and ensuring a reliable holding of the card with an increased holding force.

The shape of the feeling lock member 56 is not limited to the flattened arcuate shape but may take any other desired shape, such as bowlike, dishlike and arc configurations.

In the card connector 40 of the present invention, the feeling lock member 56 of the feeling lock mechanism 45 has one end thereof secured to the operation lever 48 and is thus supported like a cantilevered spring. Therefore, when the lock projection 57 of the feeling lock mechanism 45 engages the lock recess 51 of the card 50, the feeling lock mechanism 45 can support and hold the card 50 reliably with an increased elastic holding force of the cantilevered spring. Further, when a withdrawing force is applied to the card 50, a corner of the lock recess 51 of the card 50 pushes the lock projection 57 of the feeling lock member 56 outwardly, disengaging the lock projection 57 from the lock recess 51, with the result that the card 50 can be pulled out from the card connector 40 smoothly.

Therefore, in the card locked state (FIG. 9) in which the lock projection 57 of the feeling lock member 56 engages the lock recess 51 of the card 50 or in the card ejected state, an attempt to forcibly pull out the card 50 can easily disengage the lock projection 57 of the feeling lock member 56 from the lock recess 51 of the card 50. This is because the feeling lock member 56 is formed from an elongate platelike spring member elastically supported like a cantilevered spring. Thus, the card connector 40 allows the card 50 to be pulled out easily without damaging the card 50 or the card connector 50 itself. Moreover, in this embodiment, the cantilevered feeling lock member 36 increases the card holding force in the card locked state and thus can hold the card 50 reliably against larger vibrations and impacts.

Further, in the card connector 40 of embodiment 3 of the present invention, the contact angle $\theta_1$ of the lock projection 57 of the feeling lock member 56 is restricted in a predetermined range, as shown in FIG. 12.

That is, the lock projection 57 of the feeling lock member 56 in the card connector 40 of embodiment 3 has a contact angle $\theta_1$ restricted in the range of 66.75° to 71.35°. As long as the contact angle $\theta_1$ is within this range, the card 50 can be pulled out properly from the card locked state without damaging the card connector 40. However, if the contact angle $\theta_1$ is less than 66.75°, withdrawing the card 50 may cause damages to the card connector 40. If on the other hand the contact angle $\theta_1$ exceeds 71.35°, the card 50 cannot be held reliably and may fall off the connector. Hence, it is desired that the contact angle $\theta_1$ of the lock projection 57 of the feeling lock member 56 be set in the range of between 66.75° and 71.35°.

The card connector 40 of embodiment 3 of the present invention in use is shown in FIG. 9 and FIG. 10. FIG. 9 illustrates a card locked state and FIG. 10 shows an enlarged view of the feeling lock portion of FIG. 9.

The card connector 40 of this embodiment is mounted on a printed circuit board of an information terminal device or electronic device, with the contacts 47 connected to associated circuits. In the state of FIG. 9 and FIG. 10 the card 50 is shown to be inserted in the card connector 40 and locked by the feeling lock mechanism 45.

When the memory card 50, for example an SD card, is inserted into the card connector 40, the front end portion of the card 50 engages the push member 54 in the card locked state of FIG. 9. The card is further advanced sufficiently inwardly, causing the lock projection 57 of the feeling lock member 56 to fall into the lock recess 51 to lock the card 50. Thus, in the card locked state of FIG. 9, the card 50 is fixed by the lock projection 57 of the feeling lock member 56 engaging the lock recess 51 after the card 50 is inserted sufficiently into the card connector 40. Hence, the card 50 in this locked state is prevented from coming off and reliably held by the feeling lock member 56.

In this card locked state, if it is attempted to forcibly pull out the card 50, the lock projection 57 of the feeling lock member 56 can easily disengage from the lock recess 51 of the card 50 because the feeling lock member 56 is formed from an elongate platelike spring member elastically supported like a cantilevered spring. Thus, the card 50 can easily be pulled out from the card connector 40 without being damaged.

Next, let us consider a case where the eject mechanism 44 is activated to bring the card 50 from the locked state shown in FIG. 9 to an ejected state. When the eject mechanism 44 is operated, the spring member 49 of the eject mechanism 44 drives the operation lever 48 outwardly, pushing the card 50 to the card ejected position through the push member 54, as in the case of embodiment 1. In this state the lock projection 57 of the feeling lock member 56 of the eject mechanism 44 remains engaged in the lock recess 51 of the card 50 as shown in FIG. 9 and FIG. 10. That is, the card 50 is ejected outwardly with the lock projection 57 still engaging the lock recess 51. Hence, the card 50 is prevented from being ejected alone and falling out of the card connector 40 and can reliably be stopped at the ejected position and held there.

In this ejected state, if the card 50 is forcibly pulled out, the lock projection 57 of the feeling lock member 56 can easily disengage from the lock recess 51 of the card 50. This is realized because the feeling lock member 56 is formed from an elongate platelike spring member elastically supported like a cantilevered spring. Thus, the card connector 40 allows the card 50 to be pulled out easily without damaging the card 50 or the card connector 40 itself.

As described above, the card connector 40 of embodiment 3 of the present invention has a hollow, flat housing formed by the base plate 42 and the metal plate cover 43 mounted on the base plate 42. In this housing the feeling lock mechanism 45 is provided in addition to the eject mechanism 44 and the contact angle $\theta_1$ of the lock projection 57 is set in a predetermined range. This arrangement of the card connector 40 allows the card 50 to be pulled out without being damaged even if the card 50 inserted in the card connector 40 is forcibly withdrawn from the card locked state or the card ejected state. This can be realized because the lock projection 57 of the feeling lock member 56 of the feeling lock mechanism 45, which is set in a predetermined contact angle range, can easily be disengaged from the lock recess 51 of the card 50. This embodiment, therefore, ensures an easy withdrawing of the card without damaging the card connector 40 as well as the card.

Further, with embodiment 3 of the present invention, it is possible to manufacture the card connector 40 in a small and robust structure so that it can suitably be applied to information terminal devices such as cellular phones. In this embodiment in particular, the feeling lock member 56 in the form of a cantilevered spring increases the card holding force in the card locked state and thus can hold the card 50 reliably against larger vibrations and impacts.

Embodiment 4

Figure 13:
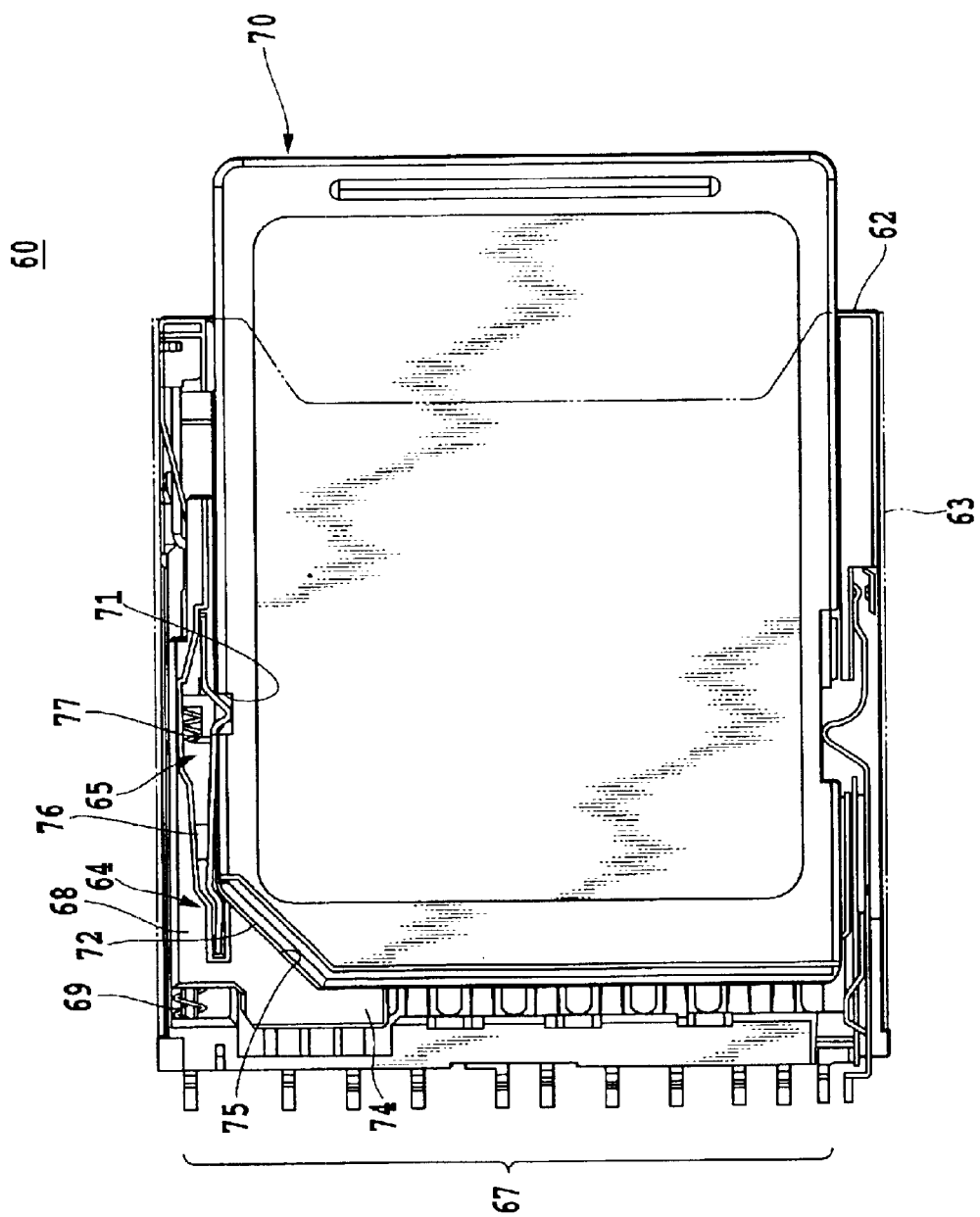
FIG. 13 is a plan view showing a card connector in embodiment 4 of the present invention in a card locked state.
Figure 14:
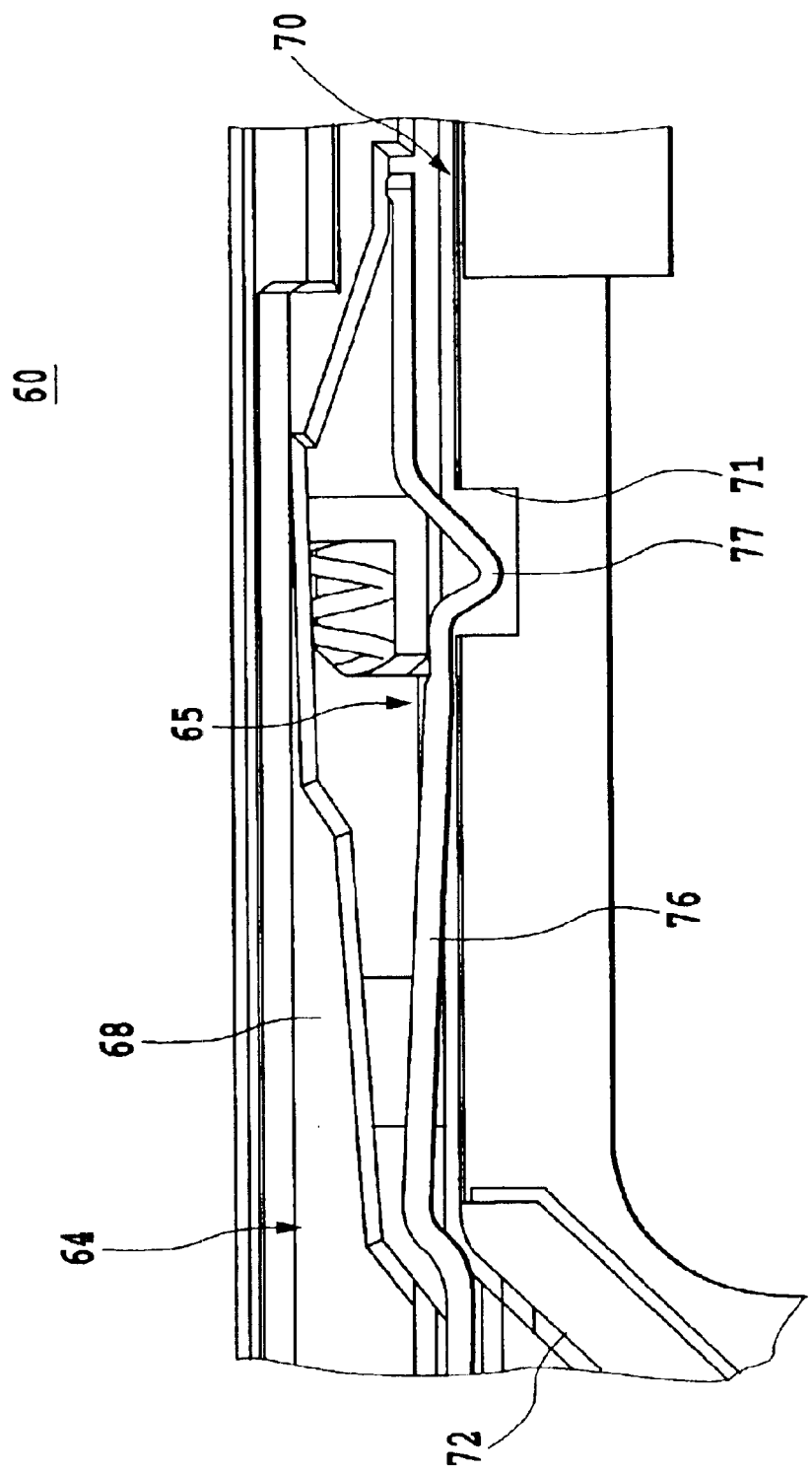
FIG. 14 is an enlarged view of a feeling lock portion and its associated parts in the card connector of FIG. 13.
Figure 15:
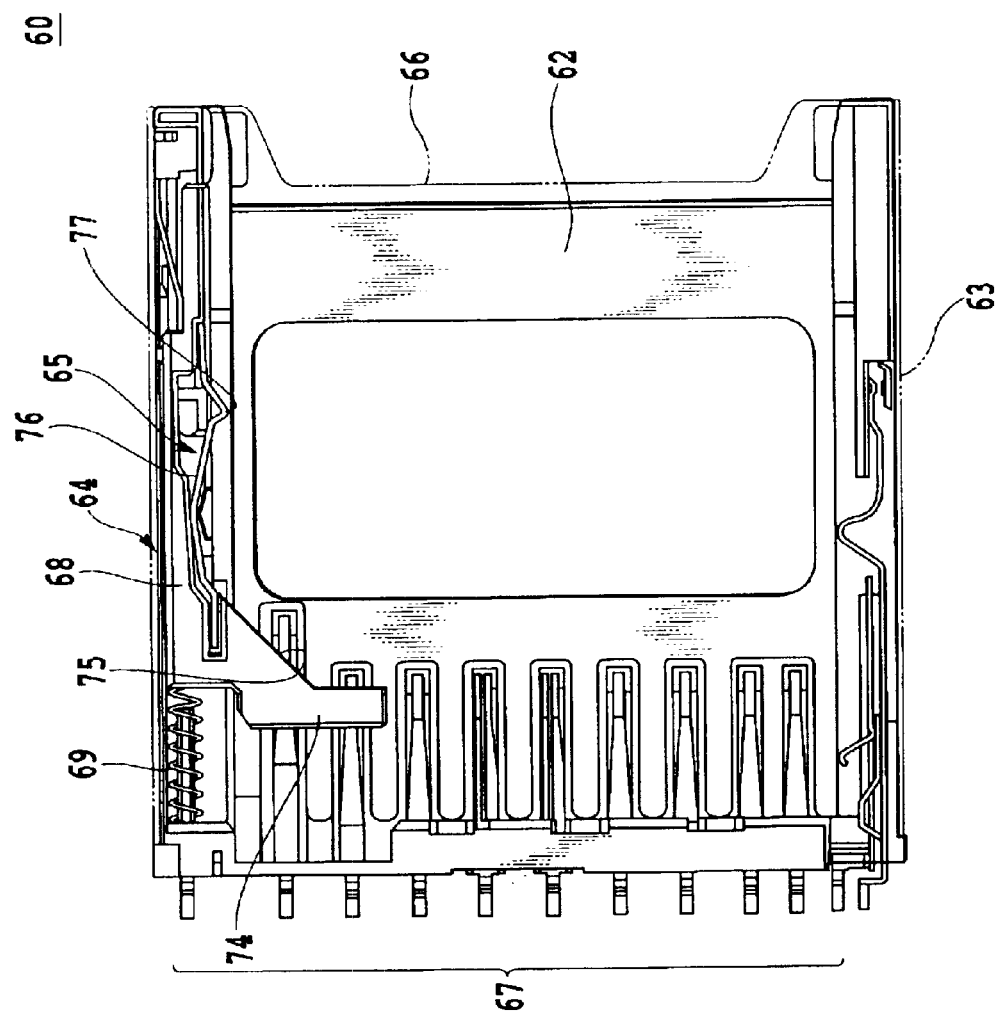
FIG. 15 is a plan view of the card connector of FIG. 13 in a card ejected state with the card removed.
Figure 16:
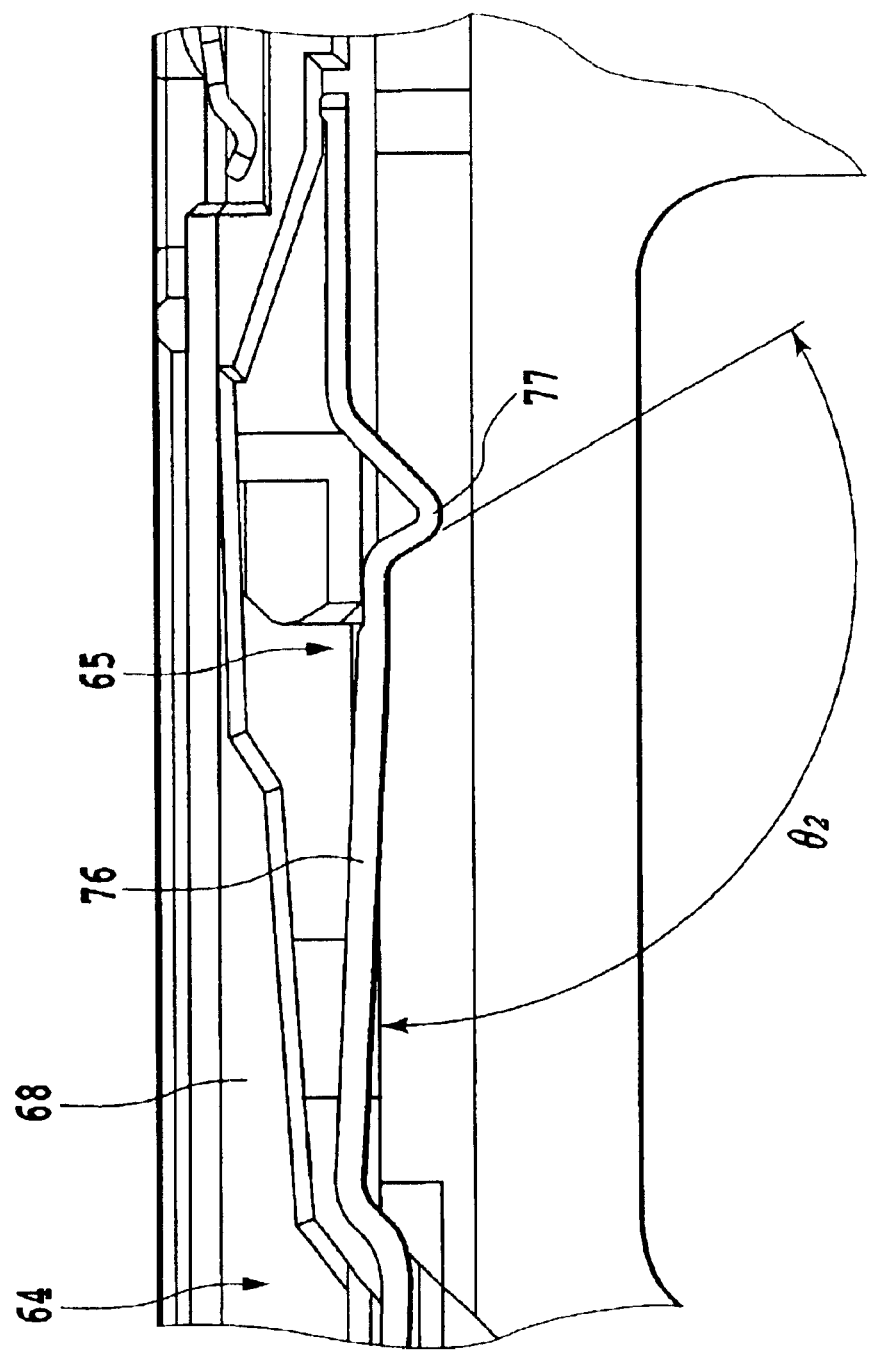
FIG. 16 is an enlarged view of a feeling lock portion and its associated parts in the card connector of FIG. 15.
Figure 17:
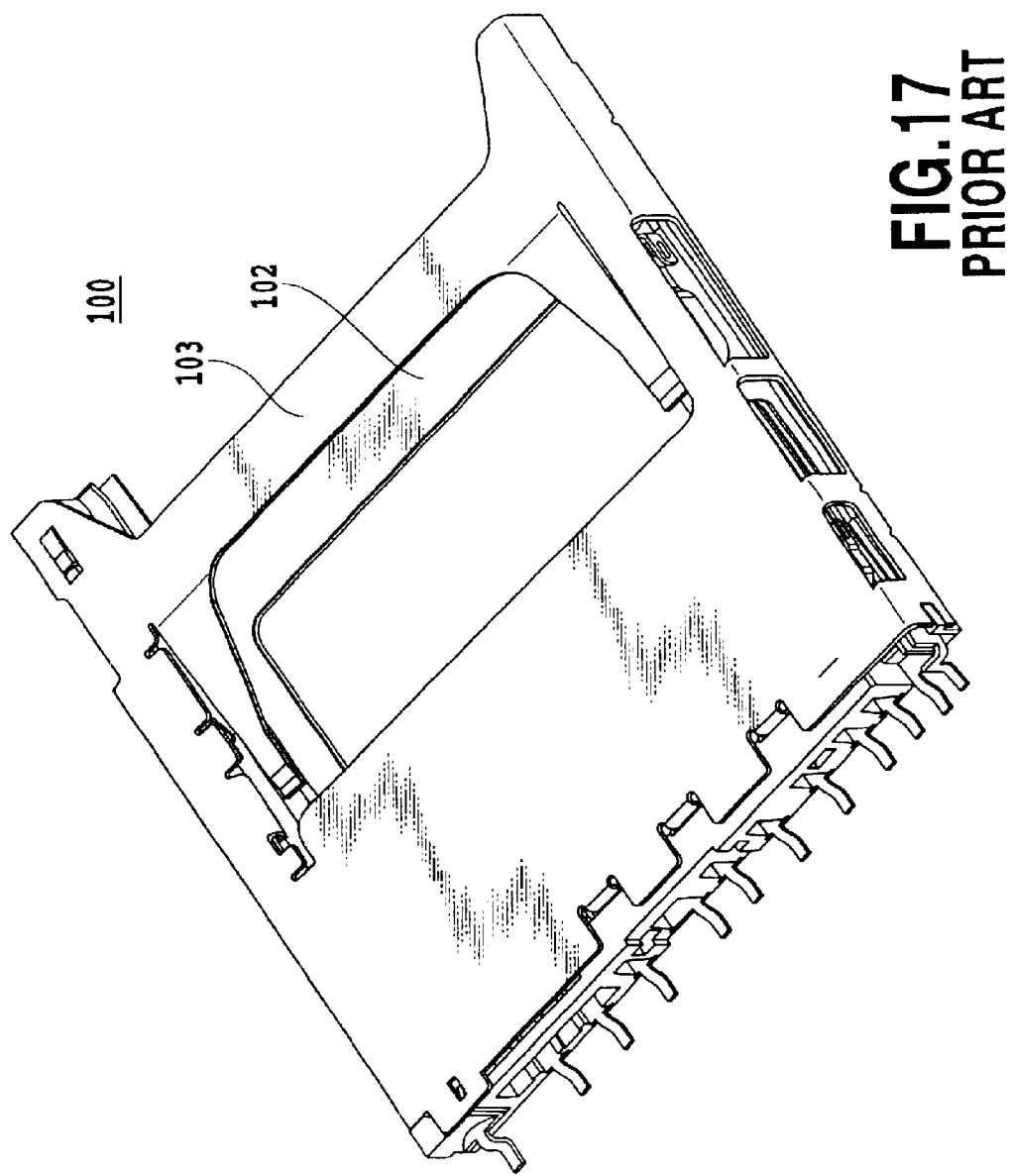
FIG. 17 is an overall perspective view of a conventional card connector.
Figure 18:
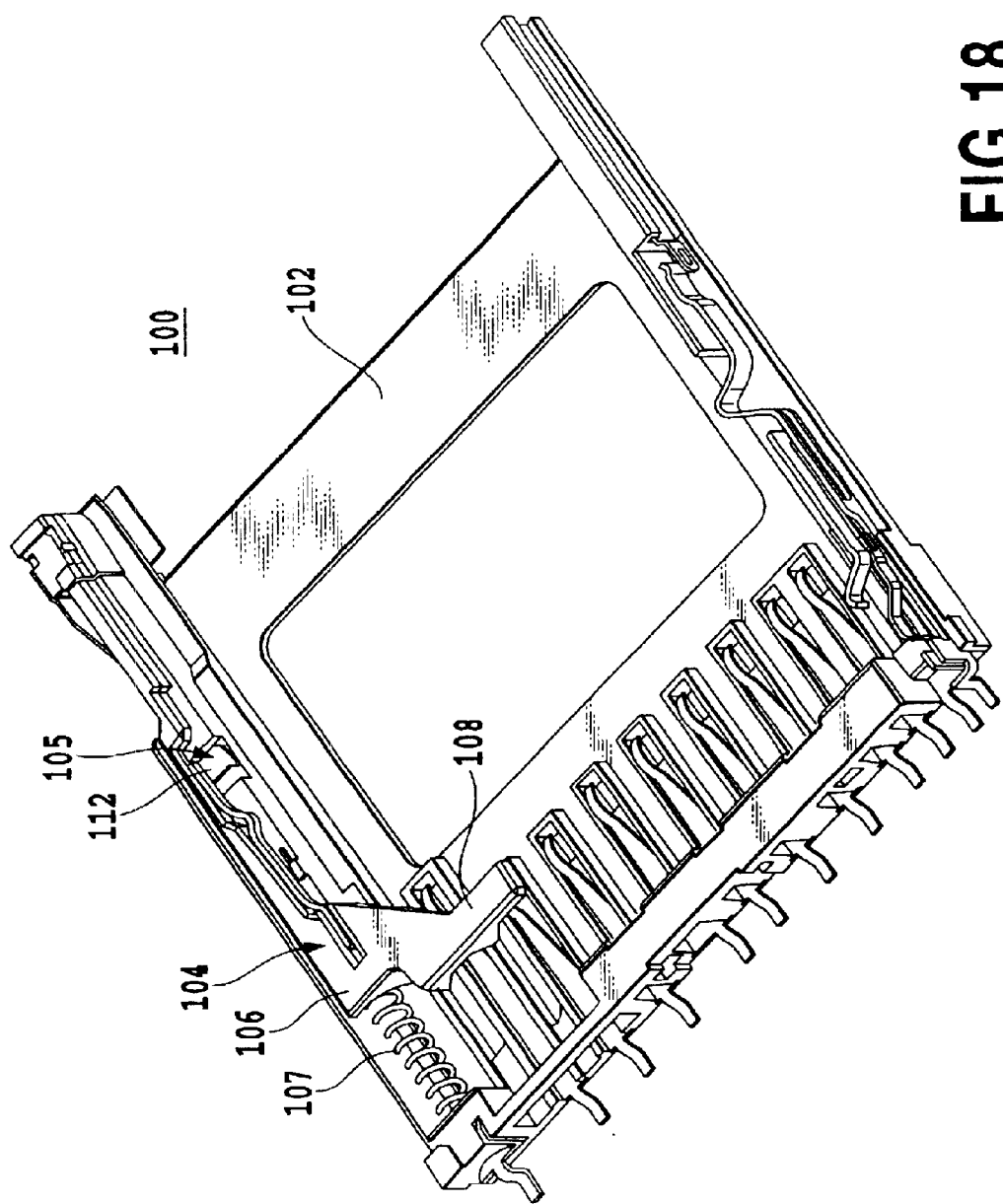
FIG. 18 is an overall perspective view of the conventional card connector of FIG. 17 with a metal plate cover removed.
Figure 19:
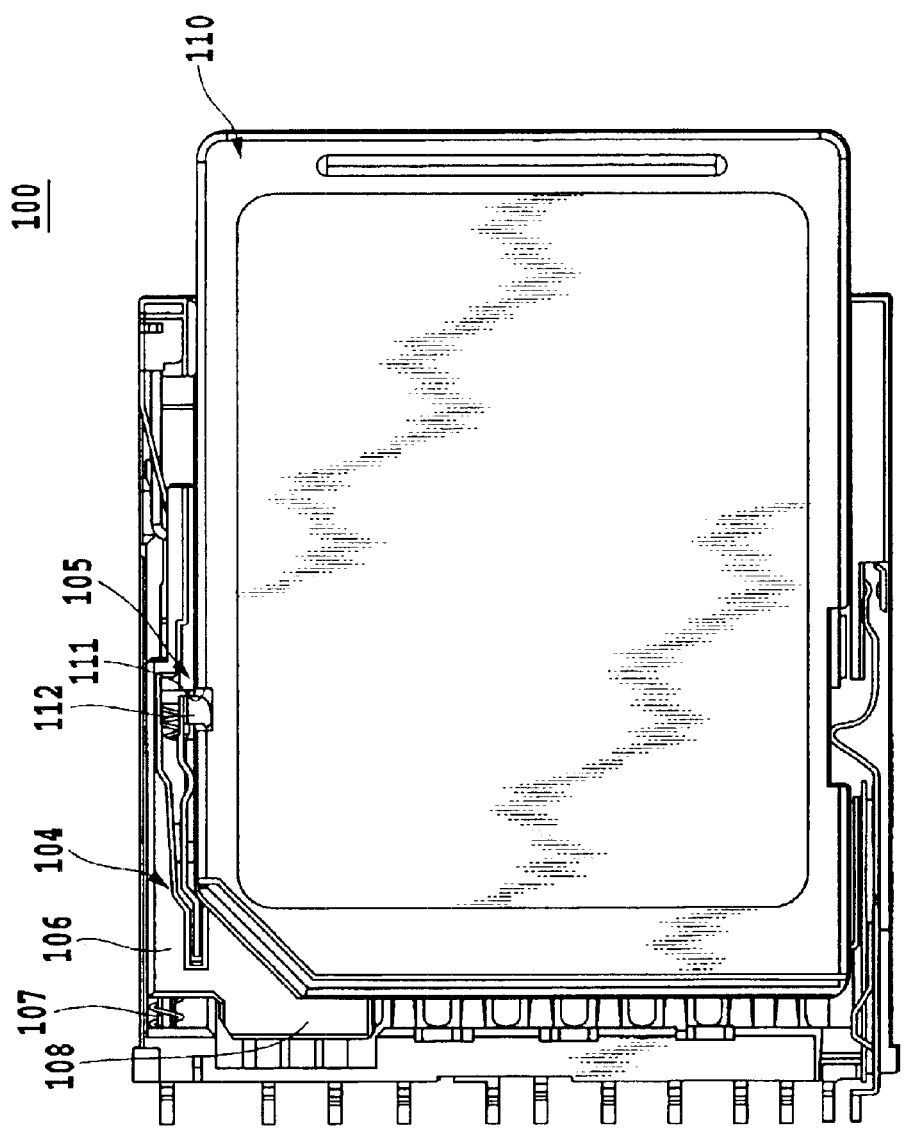
FIG. 19 is a plan view showing the conventional card connector in a card locked state.
Figure 20:
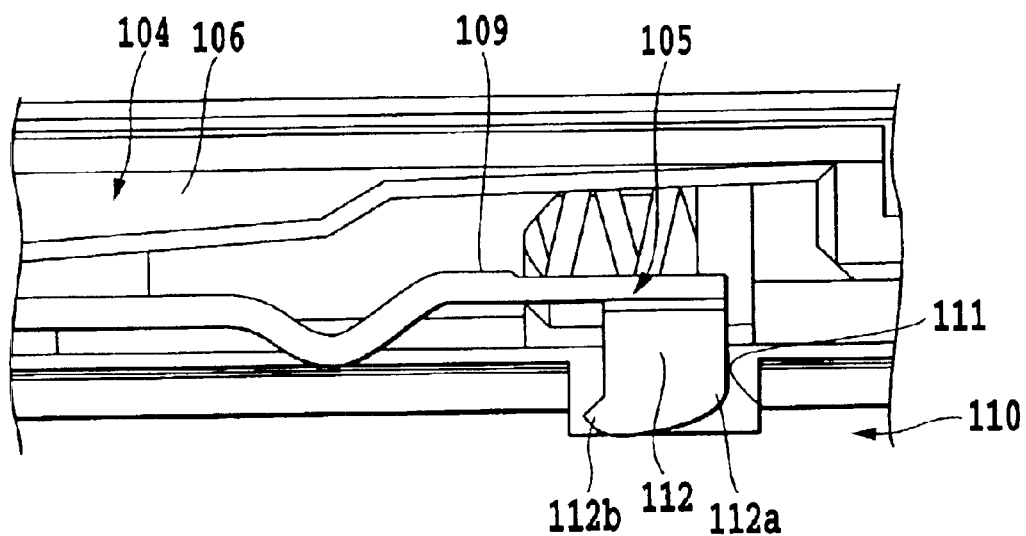
FIG. 20 is an enlarged view showing a lock portion of the card connector of FIG. 19.
Figure 21:
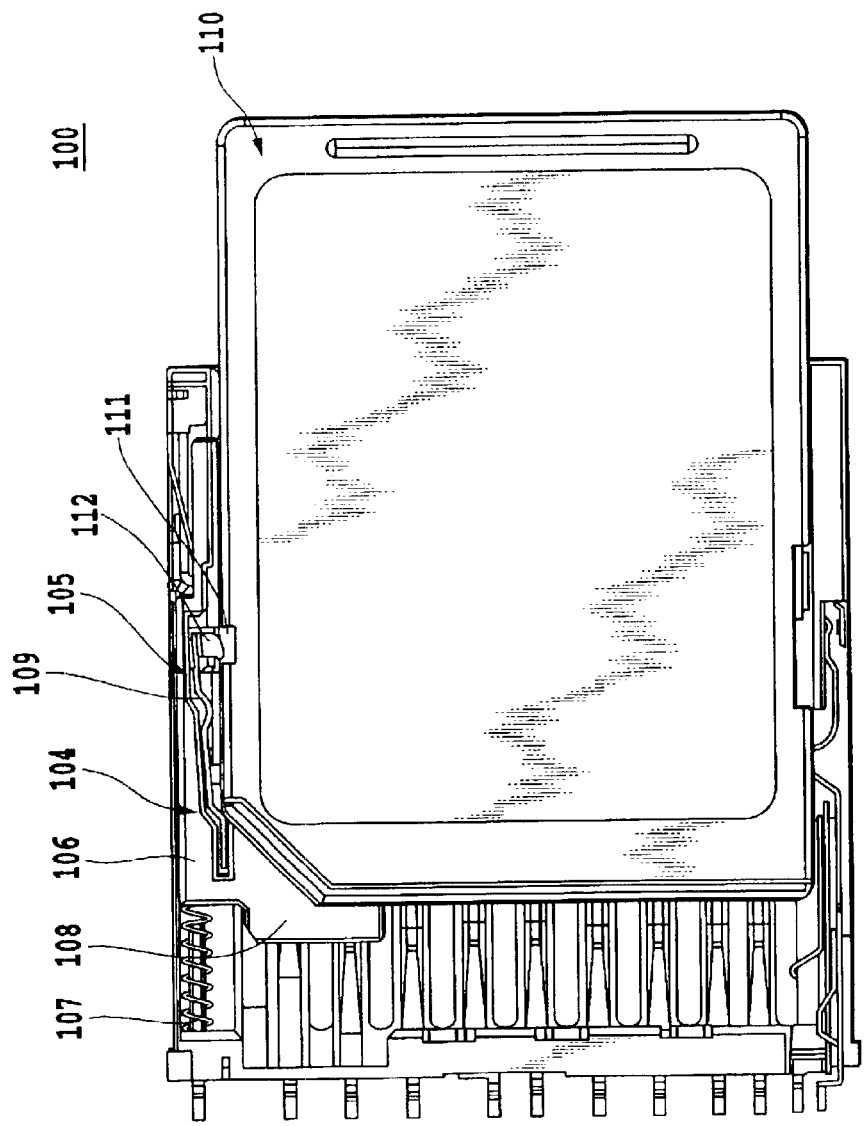
FIG. 21 is a plan view showing the conventional card connector of FIG. 17 in a card ejected state.
Figure 22:
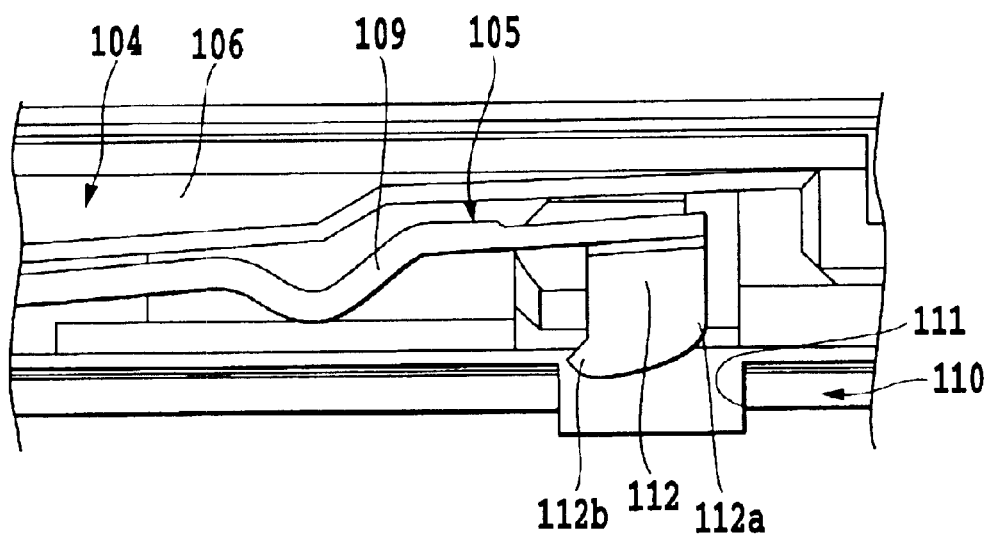
FIG. 22 is an enlarged view showing a lock portion of the card connector of FIG. 19.

FIG. 13 to FIG. 16 represent a fourth embodiment of the card connector according to the present invention. FIG. 13 is a plan view showing the card connector of embodiment 4 of the present invention in a card locked state. FIG. 14 is an enlarged view of a feeling lock portion in the card connector of FIG. 13. FIG. 15 is a plan view showing the card connector in a card ejected state with a card removed. FIG. 16 is an enlarged view showing a feeling lock portion in the card connector of FIG. 15.

As shown in FIG. 12 to FIG. 16, the card connector 60 in embodiment 4 of the present invention is similar in a basic construction to that of embodiment 2, except that a contact angle $\theta_2$ of a lock projection 77 of a feeling lock member 76 of a feeling lock mechanism 65 is restricted to a specified range.

As shown in the figures, the card connector 60 of embodiment 4 of the present invention has a flat housing formed by a base plate 62 and a metal plate cover 63 mounted on the base plate 62. The card connector 60 is open at one end in the form of a card insertion opening 66 and, at the other end, is closed and has a plurality of contacts 67 that make electrical connections with a card 70 and which extend into the card connector 60 up to its central portion.

In this embodiment, the card 70 used in the card connector 60 of the present invention may for example be an SD card, as in embodiment 1. The card connector of this embodiment is not limited to the use of SD card but other similar memory cards such as IC card can also be used without problem.

As shown in the figures, the card connector 60 of the present invention has the base plate 62, the metal plate cover 63, an eject mechanism 64 for ejecting a card, a feeling lock mechanism 65 for restraining the movement of the card, and a plurality of contacts 67. This card connector may be used, for example, on information terminal devices.

In this card connector 60, the base plate 62 is molded of an insulating material such as an appropriate synthetic resin and is combined with the metal plate cover 63 made from a metal plate to form a hollow, flat housing. The card connector 60 of course has an insertion opening to accept the card 70. Along one side of the base plate 62 of the insulating material is arranged the eject mechanism 64 which, when operated, allows the card 70 to be taken out from the card connector 60 smoothly.

The eject mechanism 64 has an operation lever 68 as an operation member mounted slidable along one side edge of a chamber formed in the base plate 62 and a spring member 69 such as a coil spring that elastically urges the operation lever 68. To push out the card 70 by the eject mechanism 64, a latch of the operation lever 68 is disengaged to allow an accumulated elastic force of the spring member 69 to push the operation lever 68 outwardly. A push member 74 is a member for ejecting the card 70 and is formed integral with the operation lever 68.

The push member 74 extends in a direction almost perpendicular to the direction in which the operation lever 68 is activated, and engages a front end portion of the card 70. A connecting portion between the operation lever 68 and the push member 74 is formed at its corner with a receiving portion 75 which a cut-off corner portion 72 of the card 70 engages. In this eject mechanism 64, therefore, the card 70 can come into contact with the push member 74 so that the card 70 can push the operation lever 68 through the push member 74 and that the operation lever 68 can eject the card 70 through the push member 74.

For prevention of erroneous operation, the card 70 has one corner cut off to form a cut-off corner portion 72, which prevents the card 70 from being placed upside down and inserted into the card connector 60.

The base plate 62, the metal plate cover 63 and the eject mechanism 64 of the card connector 60 in embodiment 4 of the present invention have essentially the same constructions as those of embodiment 2.

In addition to the eject mechanism 64, the card connector 60 of embodiment 4 of the present invention has a feeling lock mechanism 65. The feeling lock mechanism 65 has a feeling lock member 76, which is a doubly supported member made from an elongate platelike spring member secured to the operation lever 68. The feeling lock member 76 is supported at both ends by the operation lever 68 and has a middle portion thereof curved to form a lock projection 77 in a rounded triangular shape which is engageable with a lock recess 71 of the card 70.

The feeling lock member 76 is very slightly bent to one side, i.e., toward the inner side, so that it is shaped like a flattened arcuate shape. Bent in the shape of a flattened arcuation and supported at both ends, the feeling lock member 76 can produce an increased contact pressure when appropriately installed in a limited space. In other words, when the card 70 is inserted, an apex portion of the feeling lock member 76, formed by slightly bending the feeling lock member 76 to one side, engages a wall of the base plate 62 to increase a spring load, thereby preventing the card 70 from being pulled out with a small force and ensuring a reliable holding of the card 70.

The shape of the feeling lock member 76 is not limited to the flattened arcuation but may take any other desired shape, such as bowlike, dishlike and arc configurations.

In the card connector 60 of the present invention, the feeling lock member 76 of the feeling lock mechanism 65 has both ends thereof secured to the operation lever 68 and is thus supported as a doubly supported spring. Therefore, when the lock projection 77 of the feeling lock mechanism 65 engages the lock recess 71 of the card 70, the feeling lock mechanism 65 can support and hold the card 70 reliably with an elastic force of the doubly supported spring. Further, when a withdrawing force is applied to the card 70, a corner of the lock recess 71 of the card 70 pushes the lock projection 77 of the feeling lock member 76 outwardly, disengaging the lock projection 77 from the lock recess 71, with the result that the card 70 can be pulled out from the card connector 40 smoothly.

Therefore, in the card locked state (FIG. 13) in which the lock projection 77 of the feeling lock member 76 engages the lock recess 71 of the card 70 or in the card ejected state, an attempt to forcibly pull out the card 70 can easily disengage the lock projection 77 of the feeling lock member 76 from the lock recess 71 of the card 70. This is because the feeling lock member 76 is formed from an elongate platelike spring member elastically supported like a doubly supported spring. Thus, the card connector 60 allows the card 70 to be pulled out easily without damaging the card 70 or the card connector 60 itself. Moreover, in this embodiment, the doubly supported feeling lock member 76 increases the card holding force in the card locked state and thus can hold the card 70 reliably against larger vibrations and impacts.

Further, in the card connector 60 of embodiment 4 of the present invention, the contact angle $\theta_2$ of the lock projection 77 of the feeling lock member 76 is restricted in a predetermined range, as shown in FIG. 16.

That is, the lock projection 77 of the feeling lock member 76 in the card connector 60 of embodiment 4 has a contact angle $\theta_2$ determined in the range of 100° to 120°. As long as the contact angle $\theta_2$ is within this range, the card 70 can be pulled out properly from the card locked state without damaging the card connector 60 of the present invention. However, if the contact angle $\theta_2$ is less than 100°, withdrawing the card 70 may cause damages to the card connector 60. If on the other hand the contact angle $\theta_2$ exceeds 120°, the card 70 cannot be held reliably and may fall off the connector. Hence, it is desired that the contact angle $\theta_2$ of the lock projection 77 of the doubly supported feeling lock member 76 be set in the range of between 100° and 120°.

The card connector 60 of embodiment 4 of the present invention in use is shown in FIG. 13 and FIG. 14. FIG. 13 illustrates a card locked state and FIG. 14 shows an enlarged view of the feeling lock portion of FIG. 13.

The card connector 60 of this embodiment is mounted on a printed circuit board of an information terminal device or electronic device, with the contacts 67 connected to associated circuits. In the state of FIG. 13 and FIG. 14 the card 70 is shown to be inserted in the card connector 60 of the present invention and locked by the feeling lock mechanism 65.

When the memory card 70, for example an SD card, is inserted into the card connector 60, the front end portion of the card 70 engages the push member 74 in the card locked state of FIG. 13. The card is further advanced sufficiently inwardly, causing the lock projection 77 of the feeling lock member 76 to fall into the lock recess 71 to lock the card 70. Thus, in the card locked state of FIG. 13, the card 70 is fixed by the lock projection 77 of the feeling lock member 76 engaging the lock recess 71 after the card 70 is inserted sufficiently into the card connector 60. Hence, the card 70 in this locked state is prevented from coming off and reliably held by the feeling lock member 76.

In this card locked state, if it is attempted to forcibly pull out the card 70, the lock projection 77 of the feeling lock member 76 can easily disengage from the lock recess 71 of the card 70 because the feeling lock member 76 is formed from an elongate platelike spring member elastically supported like a doubly supported spring. Thus, the card 70 can easily be pulled out from the card connector 60 without being damaged.

Next, let us consider a case where the eject mechanism 64 is activated to bring the card 70 from the locked state shown in FIG. 13 to an ejected state. When the eject mechanism 64 is operated, the spring member 69 of the eject mechanism 64 drives the operation lever 68 outwardly, pushing the card 70 to the card ejected position through the push member 74, as in the case of embodiment 2. In this state the lock projection 77 of the feeling lock member 76 of the eject mechanism 64 remains engaged in the lock recess 71 of the card 70 as shown in FIG. 13 and FIG. 14. That is, the card 70 is ejected outwardly with the lock projection 77 still engaging the lock recess 71. Hence, the card 70 is prevented from being ejected alone and falling out of the card connector 60 and can reliably be stopped at the ejected position and held there.

In this ejected state, if the card 70 is forcibly pulled out, the lock projection 77 of the feeling lock member 76 can easily disengage from the lock recess 71 of the card 70. This is realized because the feeling lock member 76 is formed from an elongate platelike spring member elastically supported like a doubly supported spring. Thus, the card connector 60 allows the card 70 to be pulled out easily without damaging the card connector 60 itself as well as the card 70.

As described above, the card connector 60 of embodiment 4 of the present invention has a hollow, flat housing formed by the base plate 62 and the metal plate cover 63 mounted on the base plate 62. In this housing the feeling lock mechanism 65 is provided in addition to the eject mechanism 64 and the contact angle $\theta_2$ of the lock projection 77 is set in a predetermined range. With this arrangement of the card connector 60, if the card 70 inserted in the card connector 60 is forcibly drawn out from the card locked state or the card ejected state, the lock projection 77 of the feeling lock member 76 of the feeling lock mechanism 65, which is set in a predetermined contact angle range, can easily be disengaged from the lock recess 71 of the card 70. This ensures that the card 70 can be pulled out easily without causing any damage to the card 70 or the card connector 60 itself.

Further, with embodiment 4 of the present invention, it is possible to manufacture the card connector 60 in a small and robust structure so that it can suitably be applied to information terminal devices such as cellular phones. In this embodiment in particular, the feeling lock member 76 in the form of a doubly supported spring increases the card holding force in the card locked state and thus can hold the card 70 reliably against larger vibrations and impacts.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A card connector comprising:

a housing formed by a base plate and a metal plate cover mounted on the base plate;

an eject mechanism provided in the housing, the eject mechanism including an operation member mounted slidable along one side of the housing, a spring member to elastically urge the operation member, and an eject member integrally formed with the operation member; and a feeling lock mechanism configured to restrain a card motion, the feeling lock mechanism comprising a feeling lock member formed from an elongate plate-like spring member and a V-shaped lock projection with a rounded apex configured to engage a lock recess of the card when inserted in the housing, and wherein the feeling lock member is configured to allow the inserted card to be pulled from the housing when the card is in a locked state or a card-ejected state.

2. A card connector as claimed in claim 1, wherein the feeling lock member is so formed that the lock projection can engage the lock recess of the card inserted in the housing.

3. A card connector as claimed in claim 1, wherein the feeling lock member is provided on the operation member of the eject mechanism.

4. A card connector as claimed in claim 1, wherein the feeling lock member is slightly bent to one side.

5. A card connector as claimed in claim 2, wherein the feeling lock member is supported at one end thereof and, at the other end, is formed with the lock projection.

6. A card connector as claimed in claim 1, wherein the lock projection is formed in a letter V geometry that has a predetermined range of contact angle.

7. A card connector as claimed in claim 6, wherein the range of contact angle of the lock projection is about 66.75° to 71.35°.

8. A card connector comprising:
- a housing formed by a base plate and a metal plate cover mounted on the base plate;
- an eject mechanism provided in the housing to eject a card, the eject mechanism including an operation member mounted slidable along one side of the housing, a spring member to elastically urge the operation member, and an eject member integrally formed with the operation member; and
- a feeling lock mechanism configured to restrain a motion of the card, the feeling lock mechanism having a feeling lock member formed from an elongate plate-like spring member and supported at both ends thereof to have a V-shaped lock projection with a rounded apex to engage a lock recess of the card inserted in the housing at almost a middle portion thereof, and wherein the feeling lock member is configured to allow the inserted card in the housing to be pulled out when in a card locked state or a card ejected state.

9. A card connector as claimed in claim 8, wherein the feeling lock member is so formed that the lock projection can engage the lock recess of the card inserted in the housing.

10. A card connector as claimed in claim 8, wherein the feeling lock member is provided on the operation member of the eject mechanism.

11. A card connector as claimed in claim 8, wherein the feeling lock member is slightly bent to one side.

12. A card connector as claimed in claim 8, wherein the lock projection is formed in a letter V geometry that has a predetermined range of contact angle.

13. A card connector as claimed in claim 12, wherein the range of contact angle of the lock projection is about 100° to 120°.

* * * * *